(12) United States Patent
Hudelson et al.

(10) Patent No.: US 12,008,745 B2
(45) Date of Patent: Jun. 11, 2024

(54) SYSTEM AND METHODS FOR PRINTING DEFECT DETECTION

(71) Applicant: Desktop Metal, Inc., Burlington, MA (US)

(72) Inventors: George Hudelson, Billerica, MA (US); Matthew McCambridge, Burlington, MA (US); Jake Dec, Burlington, MA (US); Alexander Legendre, Boston, MA (US)

(73) Assignee: Desktop Metal, Inc., Burlington, MA (US)

( * ) Notice: Subject to any disclaimer, the term of this patent is extended or adjusted under 35 U.S.C. 154(b) by 734 days.

(21) Appl. No.: 17/116,539

(22) Filed: Dec. 9, 2020

(65) Prior Publication Data
US 2021/0170483 A1    Jun. 10, 2021

Related U.S. Application Data

(60) Provisional application No. 62/945,359, filed on Dec. 9, 2019.

(51) Int. Cl.
*G06T 7/00* (2017.01)
*B22F 1/10* (2022.01)
(Continued)

(52) U.S. Cl.
CPC .............. *G06T 7/0004* (2013.01); *B22F 1/10* (2022.01); *B22F 3/105* (2013.01); *B33Y 50/02* (2014.12);
(Continued)

(58) Field of Classification Search
None
See application file for complete search history.

(56) References Cited

U.S. PATENT DOCUMENTS 9,855,698 B2 * 1/2018 Perez .................... B29C 48/266
10,857,738 B2 * 12/2020 Yun ......................... B22F 12/17
(Continued)

FOREIGN PATENT DOCUMENTS

CN         106312062 A  *  1/2017   ............. B22F 10/00
WO     WO-2018022093 A1 *  2/2018   ........... B29C 64/165
(Continued)

OTHER PUBLICATIONS

Bakhadyrov, Izzat, et al. "Defect detection in indirect layered manufacturing". Proceedings of the IEEE International Conference on Systems, Man, and Cybernetics. DOI: 10.1109/ICSMC.1998. 727513 (Year: 1998).*

*Primary Examiner* — Vu Le
*Assistant Examiner* — Charles C L Penny
(74) *Attorney, Agent, or Firm* — Oak Law, PLLC; Jonathan D. Hall

(57) ABSTRACT

An additive manufacturing method includes depositing a first amount of metal powder onto a powder bed of a printing system, spreading the first amount of metal powder across the powder bed to form a first layer, and depositing a first amount of binder material on the first layer. The additive manufacturing method also includes exposing the first layer to a first lighting condition, imaging the first layer under the first lighting condition to generate a first image, analyzing the first image of the first layer, and determining whether to adjust at least one printing parameter based on the analyzing.

19 Claims, 17 Drawing Sheets

(51) Int. Cl.
   *B22F 3/105*   (2006.01)
   *B22F 10/85*   (2021.01)
   *B33Y 10/00*   (2015.01)
   *B33Y 50/02*   (2015.01)

(52) U.S. Cl.
   CPC ........... *B22F 10/85* (2021.01); *B22F 2203/00* (2013.01); *B33Y 10/00* (2014.12); *G06T 7/001* (2013.01); *G06T 2207/30144* (2013.01)

(56) References Cited

U.S. PATENT DOCUMENTS

| | | | | |
|---|---|---|---|---|
| 2006/0111807 A1* | 5/2006 | Gothait | ................ | B29C 64/393 |
| | | | | 700/119 |
| 2014/0308153 A1* | 10/2014 | Ljungblad | ............... | B22F 10/28 |
| | | | | 419/53 |
| 2020/0160497 A1* | 5/2020 | Shah | ...................... | G06T 7/001 |

FOREIGN PATENT DOCUMENTS

| | | | | |
|---|---|---|---|---|
| WO | WO-2018194680 A1 * | 10/2018 | ............. | B22F 10/10 |
| WO | WO-2020046212 A1 * | 3/2020 | ............. | B29C 64/20 |

* cited by examiner

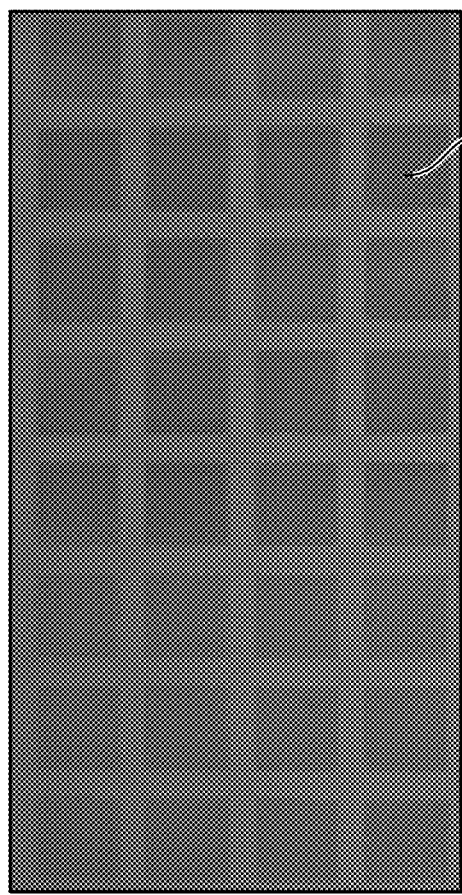
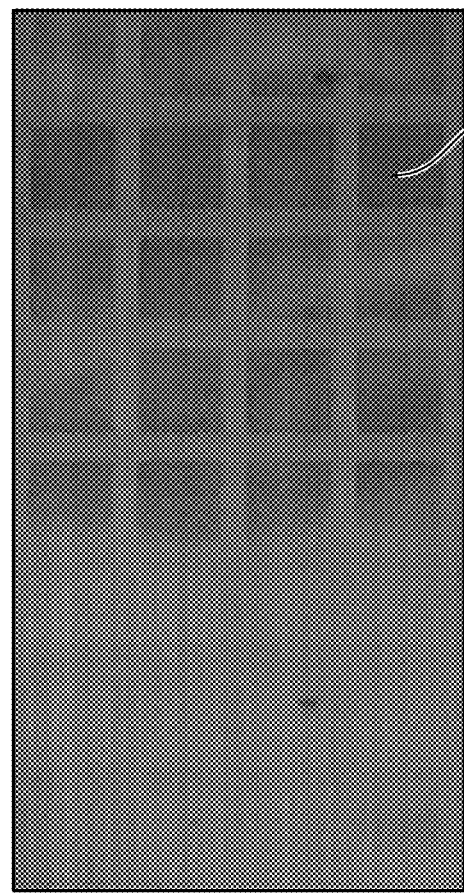
FIG. 15A  FIG. 15B

SYSTEM AND METHODS FOR PRINTING DEFECT DETECTION

CROSS-REFERENCE TO RELATED APPLICATIONS

This application claims the benefit under 35 U.S.C. § 119(e) of U.S. Provisional Application No. 62/945,359 filed Dec. 19, 2019, the contents of which are herein incorporated by reference in their entirety.

FIELD OF THE DISCLOSURE

Various aspects of the present disclosure relate generally to systems and methods for fabricating components by additive manufacturing, and specifically, to systems and methods for promoting uniformity in a powder bed of a binder-jet three-dimensional printer.

BACKGROUND OF THE DISCLOSURE

Powder bed three-dimensional fabrication is an additive manufacturing technique based on binding particles of a powder to form a three-dimensional object within the powder bed. Binder jetting is one type of powder bed three-dimensional fabrication. Binder jetting includes delivering powder, e.g., metal powder, to a print bed, spreading the powder into a layer, and depositing a binder material, e.g., a binder fluid, on top of the powder to bind the powder together. The binder material is deposited in a pre-determined pattern (e.g., in a cross-sectional shape of the three-dimensional object) to successive layers of powder in a powder bed such that the powder particles bind to one another where the binder material is located to form a three-dimensional green part. In the context of binder jet printing of three-dimensional metal objects, a three-dimensional green part may be formed by printing as described above, and may then be processed further into a finished three-dimensional metal part. For example, excess, unbound metal powder may be removed from the powder bed. Then, the three-dimensional green part may be heated in a furnace to remove the binder material and/or sintered to form the final, three-dimensional part.

When binder-jetting the three-dimensional green part, defects may occur when powder particles or binder are distributed unevenly on the powder bed. For example, defects such as unintended mounds or blisters, divots, and/or smears may occur when powder particles are distributed in an unintended manner, are overly cohesive, and/or are disturbed by forces experienced during printing. Additionally, when the powder particles are overly mobile, powder may be ejected during the printing process, by, e.g., the deposition of binder on the powder bed. The ejected powder may deposit on the print head, where the powder can potentially block or clog orifices needed for depositing binder.

The systems and methods of the present disclosure may address one or more of the deficiencies described above and/or may address other aspects of the prior art.

SUMMARY

Examples of the present disclosure relate to, among other things, systems and methods for defect detection during additive manufacturing. Each of the examples disclosed herein may include one or more of the features described in connection with any of the other disclosed examples.

In one aspect, an additive manufacturing method may include depositing a first amount of metal powder onto a powder bed of a printing system, spreading the first amount of metal powder across the powder bed to form a first layer, and depositing a first amount of binder material on the first layer. The additive manufacturing method may also include exposing the first layer to a first lighting condition, imaging the first layer under the first lighting condition to generate a first image, analyzing the first image, and determining whether to adjust at least one printing parameter based on the analyzing.

In another aspect, an additive manufacturing apparatus may include a powder bed for receiving metal powder, a spreader configured to traverse the powder bed to spread the metal powder to form a layer, a first light source configured to illuminate the powder bed, and a second light source configured to illuminate the powder bed, wherein the first light source is positioned so as to form a first angle relative to the powder bed, wherein the second light source is positioned so as to form a second angle relative to the powder bed, and wherein the first angle is less than the second angle. The additive manufacturing apparatus may also include an imaging device configured to image the powder bed, and a vapor deposition device configured to deposit vapor onto the powder bed. The additive manufacturing apparatus may include a controller configured to control the light source, the imaging device, the spreader, and the vapor deposition device so that: the spreader traverses the powder bed to spread a layer of powder on the powder bed, the first light source illuminates the layer, the imaging device images the layer illuminated by the first light source, the second light source illuminates the layer, the imaging device images the layer illuminated by the second light source, and the controller adjusts at least one printing parameter of the at least one additive manufacturing apparatus.

In another aspect, an additive manufacturing method may include depositing a first amount of powder onto a powder bed, spreading the first amount of powder across the powder bed to form a first layer of powder, applying a vapor to the first layer, and depositing a binder on the first layer. The additive manufacturing method may also include imaging the first layer under a first lighting condition to generate a first image, imaging the first layer under a second lighting condition to generate a second image, and determining whether to adjust at least one printing parameter based on the first image and the second image.

Both the foregoing general description and the following detailed description are exemplary and explanatory only and are not restrictive of the features, as claimed. As used herein, the terms "comprises," "comprising," "including," "having," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. In this disclosure, unless stated otherwise, relative terms, such as, for example, "about," "substantially," and "approximately" are used to indicate a possible variation of +/−10% in the stated value. Moreover, in the claims, values, limits, and/or ranges of various claimed elements and/or features means the stated value, limit, and/or range +/−10%. The terms "object," "part," and "component," as used herein, are intended to encompass any object fabricated through the additive manufacturing techniques described herein.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure.

FIGS. 15A-B are top views of the powder bed of FIGS. 14A and 14B as imaged by the exemplary defect detection system.

DETAILED DESCRIPTION

Embodiments of the present disclosure include systems and methods to facilitate and improve the efficacy and efficiency of additive manufacturing, in particular, to mitigate issues in low-speed or high-speed printing. Reference now will be made in detail to examples of the present disclosure described above and illustrated in the accompanying drawings. Wherever possible, the same reference numbers will be used throughout the drawings to refer to the same or like parts.

Figure 1A:
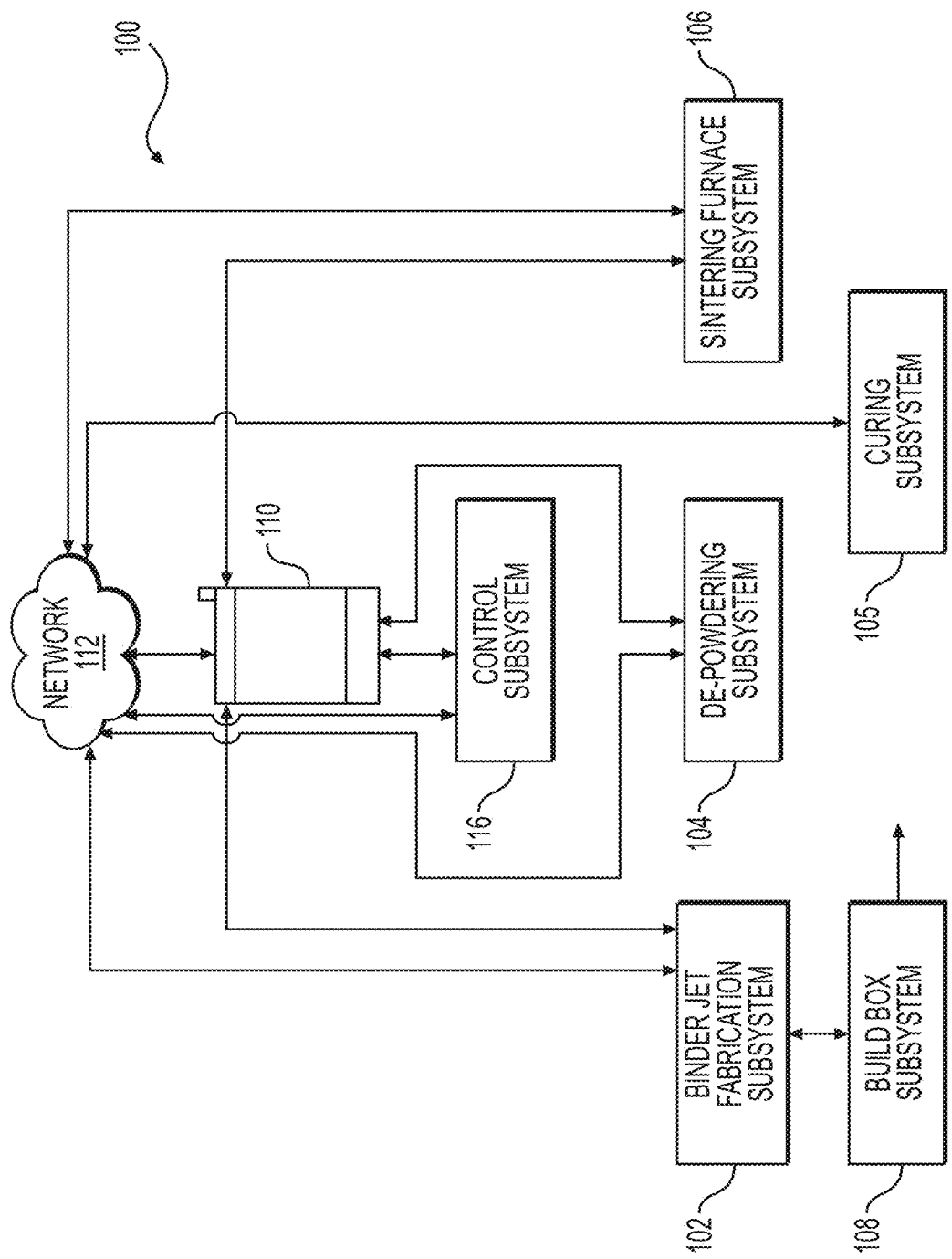
FIG. 1A is an exemplary block diagram of an additive manufacturing system.

FIG. 1A illustrates an exemplary system 100 for forming a printed object, according to an embodiment of the present disclosure. System 100 may include a printer, for example, a binder jet fabrication subsystem 102, and one or more treatment site(s), for example, a de-powdering subsystem 104, a curing subsystem 105, and a sintering furnace subsystem 106. Binder jet fabrication subsystem 102 may be used to form an object from a build material, for example, by delivering successive layers of build material and binder material to a build plate. As shown in FIG. 1A, a build box subsystem 108 may be movable and may be selectively positioned in one or more of binder jet fabrication subsystem 102, de-powdering subsystem 104, curing subsystem 105, and sintering furnace subsystem 106. For example, build box subsystem 108 may be coupled or couplable to a movable assembly. Alternatively, a conveyor (not shown) may help transport the object between portions of system 100.

The build material may be a bulk metallic, polymeric, and/or ceramic powder delivered and spread in successive layers. The binder material may be, for example, a polymeric liquid that may be deposited onto and may be absorbed into layers of the build material. One or more of binder jet fabrication subsystem 102, de-powdering subsystem 104, curing subsystem 105, and sintering furnace subsystem 106 may include a debinding station to treat the printed object to remove a binder material from the build material. Furnace subsystem 106 may heat and/or sinter the build material of the printed object. System 100 may also include a user interface 110, which may be operatively coupled to one or more components, for example, to binder jet fabrication subsystem 102, de-powdering subsystem 104, curing subsystem 105, and sintering furnace subsystem 106, etc. In some embodiments, user interface 110 may be a remote device (e.g., a computer, a tablet, a smartphone, a laptop, etc.). User interface 110 may be wired or wirelessly connected to one or more of binder jet fabrication subsystem 102, de-powdering subsystem 104, and sintering furnace subsystem 106. System 100 may also include a control subsystem 116, which may be included in user interface 110, or may be a separate element.

Binder jet fabrication subsystem 102, de-powdering subsystem 104, curing subsystem 105, sintering furnace subsystem 106, user interface 110, and/or control subsystem 116 may each be connected to the other components of system 100 directly or via a network 112. Network 112 may include the Internet and may provide communication through one or more computers, servers, and/or handheld mobile devices, including the various components of system 100. For example, network 112 may provide a data transfer connection between the various components, permitting transfer of data including, e.g., geometries, the printing material, one or more support and/or support interface details, binder materials, heating and/or sintering times and temperatures, etc., for a part or a part to be printed.

Moreover, network 112 may be connected to a cloud-based application (not shown in FIG. 1), which may also provide a data transfer connection between the various components and cloud-based application in order to provide a data transfer connection, as discussed above. The cloud-based application may be accessed by a user in a web browser, and may include various instructions, applications, algorithms, methods of operation, preferences, historical data, etc., for forming the part or object to be printed based on the various user-input details. Alternatively or additionally, the various instructions, applications, algorithms, methods of operation, preferences, historical data, etc., may be stored locally on a local server (not shown) or in a storage and/or processing device within or operably coupled to one or more of binder jet fabrication subsystem 102, de-powdering subsystem 104, curing subsystem 105, sintering furnace subsystem 106, user interface 110, and/or control subsystem 116. In this aspect, binder jet fabrication subsystem 102, de-powdering subsystem 104, curing subsystem 105, sintering furnace subsystem 106, user interface 110, and/or control subsystem 116 may be disconnected from the Internet and/or other networks, which may increase security protections for the components of system 100. In either aspect, an additional controller (not shown) may be associated with one or more of binder jet fabrication subsystem 102, de-powdering subsystem 104, and sintering furnace subsystem 106, etc., and may be configured to receive instructions to form the printed object and to instruct one or more components of system 100 to form the printed object.

Figure 1B:
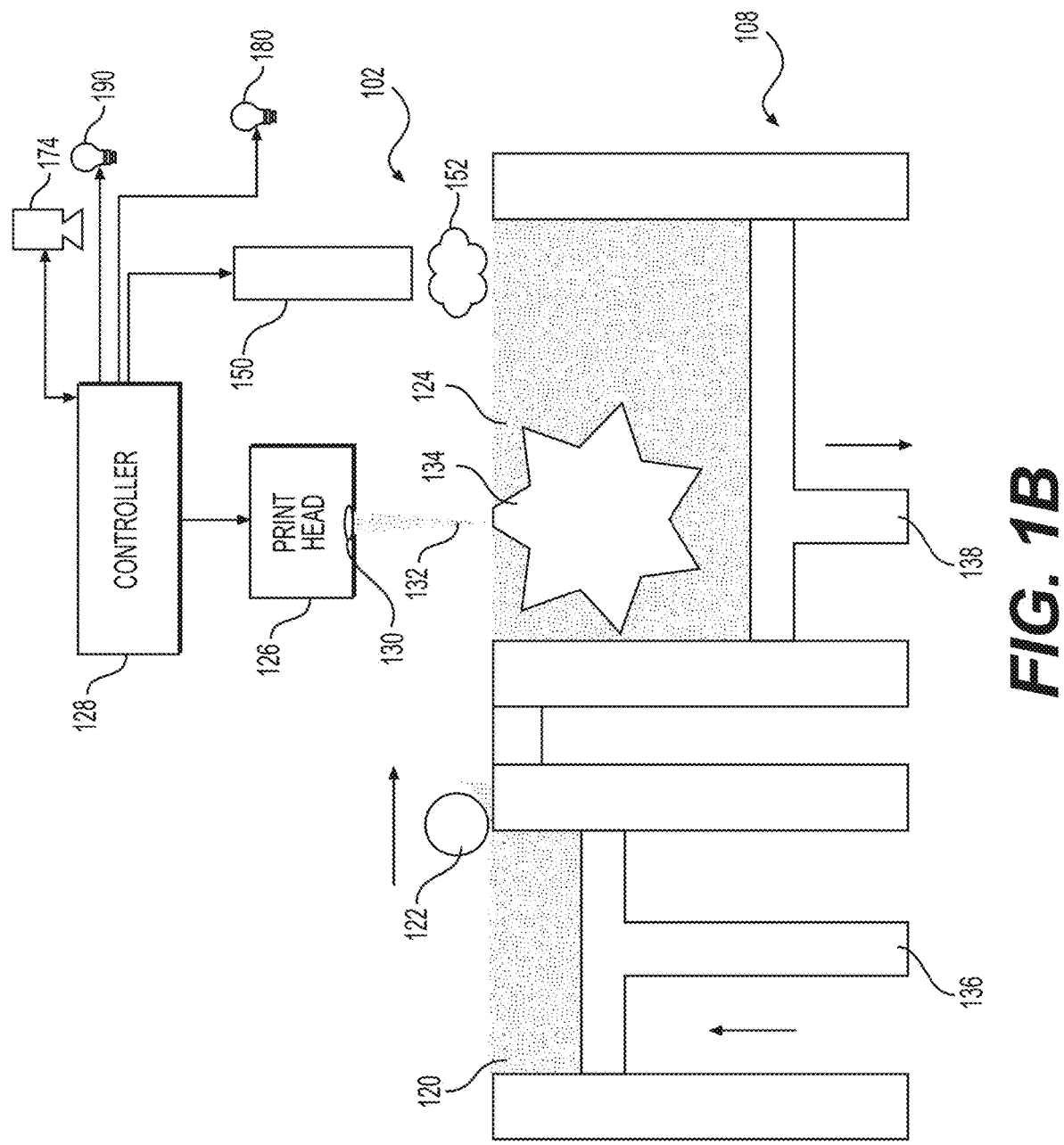
FIG. 1B illustrates an exemplary binder jet fabrication subsystem.

FIG. 1B illustrates an exemplary binder jet fabrication subsystem 102 operating in conjunction with build box subsystem 108. Binder jet fabrication subsystem 102 may include a powder supply 120, a spreader 122 (e.g., a roller) configured to be movable across a powder print bed 124 of build box subsystem 108, a print head 126 movable across powder bed 124, and a controller 128 in electrical communication (e.g., wireless, wired, Bluetooth, etc.) with print head 126. Powder bed 124 may comprise powder particles, for example, micro-particles of a metal, micro-particles of two or more metals, or a composite of one or more metals and other materials.

Spreader 122 may be movable across powder bed 124 to deposit and spread a layer of powder, from powder supply 120, across powder bed 124. Print head 126 may comprise a discharge orifice 130 and, in certain implementations, may be actuated to dispense a binder material 132 (e.g., through delivery of an electric current to a piezoelectric element in mechanical communication with binder material 132) through discharge orifice 130 to the layer of powder spread across powder bed 124. In some embodiments, the binder material 132 may be one or more fluids configured to bind together powder particles.

FIG. 1B also shows a vapor deposition device 150 that is configured to deposit vapor (e.g., steam) 152 on the powder bed 124 prior to deposition of binder material 132, as discussed further below. One or more light sources and one or more image capturing devices may be included as components of binder jet fabrication subsystem 102. In some embodiments, controller 128 may be configured to control (e.g., output control signals to) a (relatively) low-angle light source 180 and/or a (relatively) high-angle light source 190. For example, low-angle light source 180 may form an angle in the range of about 1 degree to about 10 degrees with respect to powder bed 124. In at least some embodiments, low-angle light source 180 may form an angle of about 2 degrees to about 5 degrees with respect to powder bed 124. High-angle light source 190 may form an angle of about 70 degrees to about 110 degrees with respect to powder bed 124 (i.e., from 90 degrees vertical to about 20 degrees from vertical in either direction). In at least some embodiments, high-angle light source 190 may form an angle of approximately 90 degrees with respect to powder bed 124. The particular angle may be selected at least in part based on the type(s) of defects that low-angle light source 180 and/or high angle light source 190 are being employed to identify. The low angle light source and high angle light source may be any illumination source that provides sufficient illumination level to distinguish the defects. In one embodiment the light source may have a brightness of 10-10000 and preferably 100-1000 lumens. In another embodiment the light source may consist of a collimated (that is substantially parallel) light to avoid an angular component. In another embodiment, the light source may comprise one or more light diffusers to create a diffuse illumination condition.

The high angle light source may be any illumination source that provides a sufficient illumination level to distinguish the defects. The light source must be significantly brighter than the ambient light in the room, such that the ambient lighting in the room has a minimal impact on the lighting conditions of the print bed. The high angle light is placed in such a manner to allow distribution of light that is approximately even across the entire print surface. This can be accomplished by adding a diffuser to the high angle light to evenly distribute the light over the print surface. To control the effects of the lighting on different powder materials, the image capture device is configured with specific exposure and gain values for different materials that maximize the contrast of areas of the bed that contain no binder to areas of the bed that contain binder. In an embodiment, the low angle light source may comprise a laser. A raster scanner may be employed or a diffusing element may be used to illuminate the print bed with the laser light. A raster scanner may comprise a laser configured to project a beam of light configured to produce a substantially round shape, which may be scanned (for example using a galvanometer scanner to rapidly move the beam location across the bed in two axes). Alternatively, a raster scanner may be configured to produce a beam of light with an elongated shape (that is, a line source), which may be scanned in a single axis along the print bed to illuminate defects. A diffusing element may comprise an optical element, such as a lens, a diffraction grating, or other optical element, intended to reshape a beam into a suitable shape for providing illumination, such as a one line or multiple lines, or an area with uniform or substantially uniform illumination. Other beam shapes and rastering strategies may be employed, with the objective of providing a uniform illumination to the print bed. In some embodiments, a laser light source may allow for higher illumination intensity, or improved signal to noise for image capturing, compared to a non-laser light source.

The low angle light source is intended to hit the powder bed at a low angle of incidence, which will highlight any imperfections on the ideally flat, smooth surface of the print bed. In one embodiment a collimated light is employed, in which all light travels out of the reflector in parallel. In another embodiment a light source with a narrow beam angle can also be used. In another embodiment, a source further away from the area of inspection is employed to accomplish a similar effect. For this lighting source, an even lighting condition across the bed is preferred, but not required as long as the image is not overexposed in any area as to create areas of the image that are primarily white on a print bed. Along with the angle and positioning of the light, the exposure and gain values can be modified on the image capture device to prevent this. The exposure and gain may also need to be modified based on the material that is being printed on.

Controller 128 may output command signals to, and receive data (e.g., imaging data) from, an image capturing device 174. In an exemplary configuration, low-angle light source 180, high-angle light source 190, and image capturing device 174 may be provided at predetermined fixed locations within binder jet fabrication subsystem 102. However, image capturing device 174 may be connected to a mechanism that provides locomotion to image capturing device 174, which may facilitate acquisition of images from different positions and/or minimize or eliminate obstructions. If desired, a plurality of low-angle light sources 180, a plurality of high-angle light sources 190, and/or a plurality of image capturing devices 174 may be provided at one or more different locations of binder jet fabrication subsystem 102. Image capturing device 174 may be, for example, any suitable light-detecting device, such as a camera capable of detecting visible light and/or a charge-coupled device capable of detecting ultraviolet light, infrared light, etc., or a combination thereof. When low-angle light source 180 and high-angle light source 190 are configured to produce visible light, light sources 180, 190 may produce light having different colors (i.e., different wavelengths of light within the visible spectrum), such as red and blue light. When different colors of light are used, image capturing device 174 may be configured to distinguish between different colors of light (e.g., a color charge-coupled device (CCD)). In an exemplary configuration, high-angle light source 190 may produce red light, while low-angle light source 180 may produce blue light. By capturing a color image with image capturing device 174, the defect detection system may be configured to analyze blue, red, combined red and blue, and darkened (shadow-containing) regions at the same time. This may, in at least some embodiments, eliminate the need to apply low-angle light and high-angle light at different times.

Moreover, a plurality of low-angle light sources 180 and/or a plurality of high-angle light sources 190 may be arranged at different angles and/or orientations. For example, a first low-angle light source 180 may be located so as to direct light along a translation direction of spreader 122 (e.g., X-direction, see FIGS. 2A-10B) with a second low-angle light source 180 located so as to direct light along a horizontal direction orthogonal to the translation direction of spreader 122 (e.g., Y-direction, see FIGS. 2A-10B). Such light may facilitate the identification of defects that tend to form aligned with, or orthogonal to (e.g., smears, divots), the translation direction of spreader 122. If multiple low-angle or high-angle light sources 180, 190 are included, the multiple low-angle or high-angle light sources 180, 190 may produce the same color light or different colored light. For example, in the embodiment described above, the horizontal and orthogonal low-angle light sources 180 may be the same color light (i.e., wavelength) or different color light (i.e., wavelength). Further, although red and blue light are provided as examples herein, it is understood that any suitable color (wavelength) light may be included.

In some embodiments, light sources 180 and/or 190 may be configured to produce light outside of the visible spectrum (e.g., ultraviolet light or infrared light), while in others, they may be configured to produce light within the visible spectrum. In some aspects, combinations of light sources 180 and/or 190 may be configured to produce different types of light, for example, light sources 180 and light sources 190 may be configured to produce different types of light, and/or different light sources 180 may produce different types of light, and/or different light sources 190 may produce different types of light.

In operation, controller 128 may actuate print head 126 to deliver binder material 132 from print head 126 to each layer of the powder in a pre-determined, two-dimensional pattern, as print head 126 moves across powder bed 124. In embodiments, the movement of print head 126, and the actuation of print head 126 to deliver binder material 132, may be coordinated with movement of spreader 122 across powder bed 124. For example, spreader 122 may spread a layer of the powder across powder bed 124, and print head 126 may deliver the binder in a pre-determined, two-dimensional pattern, to the layer of the powder spread across powder bed 124, to form a layer of one or more three-dimensional objects or parts 134. These steps may be repeated (e.g., with the pre-determined two-dimensional pattern for each respective layer) in sequence, with the build plate incrementing down each layer to form subsequent layers until, ultimately, the one or more parts 134 are formed in powder bed 124.

Vapor deposition device 150 may move with (and in advance of) print head 126, to deposit vapor (i.e., to condense vapor), such as water vapor, on powder bed 124. For example, vapor deposition device 150 may distribute vapor (e.g., steam) to predetermined locations of powder bed 124, causing condensation of the vapor into the powder. Vapor deposition device 150 may move together with print head 126, and may, if desired, be included as part of print head 126. Alternatively, vapor deposition device 150 may move independently of print head 126.

During operation and motion of spreader 122, print head 126, and vapor deposition device 150, each of these components may move with respect to powder bed 124. Thus, for a period of time between the deposition of each layer of powder, image capturing device 174 may have a substantially or completely unobscured view of powder bed 124. At the same time, one or both of light sources 180 and 190 may be configured to direct light toward powder bed 124, without significant light blockage from spreader 122, print head 126, or vapor deposition device 150. Image capturing device 174 may be configured to provide controller 128 with image information corresponding to an entirety of powder bed 124 or one or more areas of powder bed 124. In some embodiments, image capturing device 174 may image a first portion of powder bed 124 at a first timing, and a different second (or subsequent) portion of powder bed 124 at a second timing. Such imaging may be useful when different portions of powder bed 124 are obscured by one of the moving components at different times. Details of a defect detection system, which may include light sources 180 and 190 and image capturing device 174, is described in further detail below.

Although the exemplary embodiment depicted in FIG. 1B depicts a single part 134 being printed, it should be understood that the powder print bed 124 may include more than one part 134 in embodiments in which more than one part 134 is printed at once. Further, the powder bed 124 may be delineated into two or more subsections, stacked vertically, with one or more objects disposed within each subsection.

An exemplary binder jet fabrication subsystem 102 may comprise a powder supply actuator mechanism 136 that elevates powder supply 120 as spreader 122 spreads the powder across powder bed 124. Similarly, build box subsystem 108 may comprise a build box actuator mechanism 138 that lowers powder bed 124 incrementally as each layer of powder is distributed across powder bed 124. The distance the powder bed is lowered in each increment defines the layer thickness of the printing process.

In another exemplary embodiment, layers of powder may be applied to powder bed 124 by a hopper followed by a spreading device, such as a compaction roller. The hopper may move across powder bed 124, depositing powder along the way. The spreading device may be configured to follow the hopper, spreading the deposited powder to form a layer of powder.

Figure 1C:
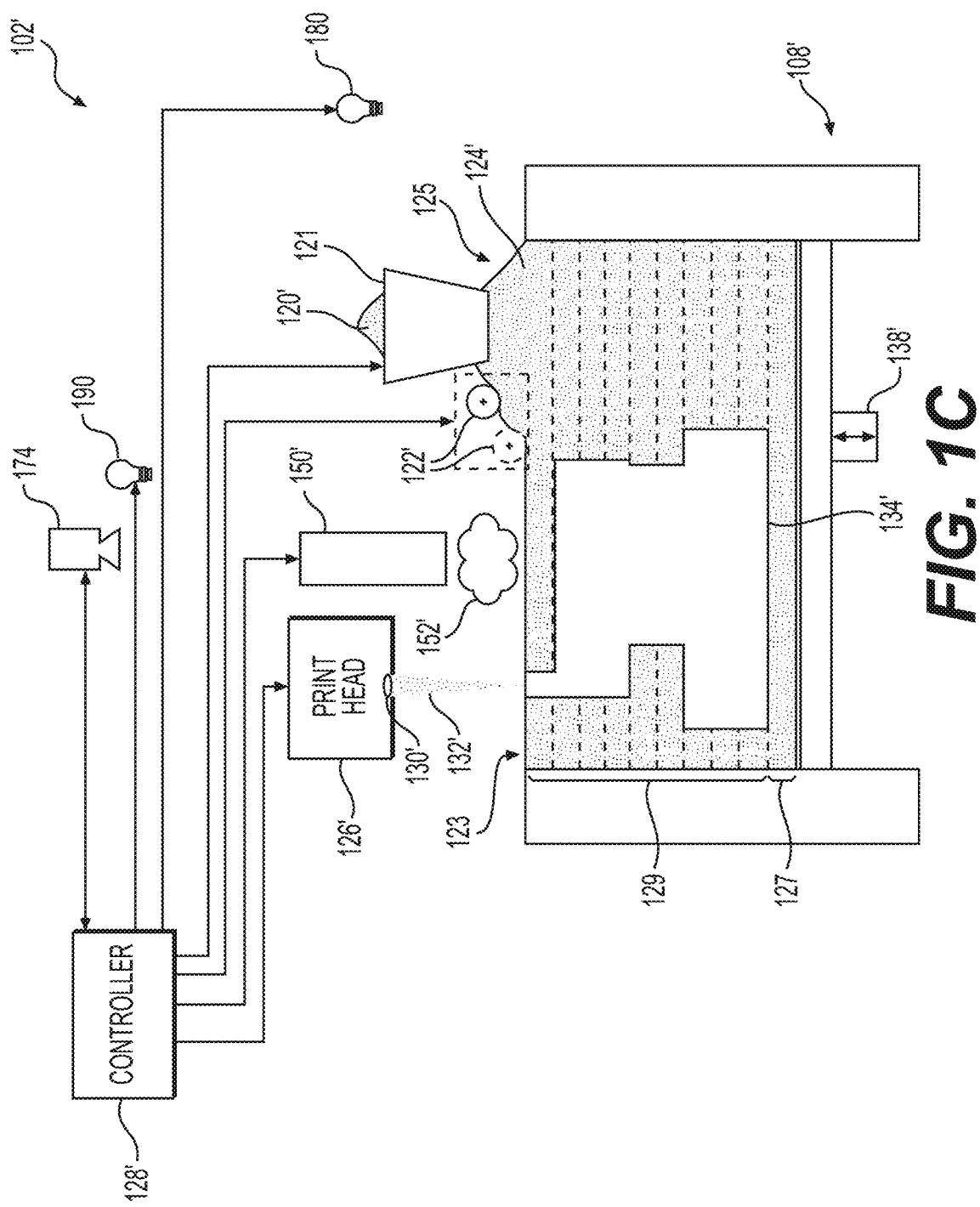
FIG. 1C illustrates another exemplary binder jet fabrication subsystem.

For example, FIG. 1C illustrates another binder jet fabrication subsystem 102' operating in conjunction with a build box subsystem 108'. In this aspect, binder jet fabrication subsystem 102' may include a powder supply 120' in a metering apparatus, for example, a hopper 121. Binder jet subsystem 102' may include a defect detection system, including light sources 180 and 190 and image capturing device 174, which may function in a similar manner as a defect detection system of binder jet subsystem 102. Binder jet subsystem 102' may also include one or more spreaders 122' (e.g., one or more rollers) configured to be movable across powder bed 124' of build box subsystem 108', a print head 126' movable across powder bed 124', and a controller 128' in electrical communication (e.g., wireless, wired, Bluetooth, etc.) with one or more of hopper 121, spreaders 122', and print head 126'. Powder bed 124' may comprise powder particles, for example, micro-particles of a metal, micro-particles of two or more metals, or a composite of one or more metals and other materials.

Hopper 121 may be any suitable metering apparatus configured to meter and/or deliver powder from powder supply 120' onto a top surface 123 of powder bed 124'. Hopper 121 may be movable across powder bed 124' to deliver powder from powder supply 120' onto top surface 123. The delivered powder may form a pile 125 of powder on top surface 123.

The one or more spreaders 122' may be movable across powder bed 124' downstream of hopper 121 to spread powder, e.g., from pile 125, across powder bed 124. The one or more spreaders 122' may also compact the powder on top surface 123. In either aspect, the one or more spreaders 122' may form a layer 127 of powder. The aforementioned powder delivery and spreading steps may be successively performed in order to form a plurality of layers 129 of powder. Additionally, although two spreaders 122' are shown in FIG. 1C, binder jet fabrication subsystem 102' may include one, three, four, etc. spreaders 122'.

Print head 126' may comprise a discharge orifice 130' and, in certain implementations, may be actuated to dispense a binder material 132' (e.g., through delivery of an electric current to a piezoelectric element in mechanical communication with binder material 132') through discharge orifice 130' to the layer of powder spread across powder bed 124'. In some embodiments, the binder material 132' may be one or more fluids configured to bind together powder particles.

In operation, controller 128' may actuate print head 126' to deliver binder material 132' from print head 126' to each layer 127 of the powder in a pre-determined two-dimensional pattern, as print head 126' moves across powder bed 124'. As shown in FIG. 1C, controller 128' may be in communication with hopper 121 and/or the one or more spreaders 122' as well, for example, to actuate the movement of hopper 121 and the one or more spreaders 122' across powder bed 124'. Additionally, controller 128' may control the metering and/or delivery of powder by hopper 121 from powder supply 120' to top surface 123 of powder bed 124'. In embodiments, the movement of print head 126', and the actuation of print head 126' to deliver binder material 132', may be coordinated with movement of hopper 121 and the one or more spreaders 122' across powder bed 124'. For example, hopper 121 may deliver powder to bed 124', and spreader 122' may spread a layer of the powder across powder bed 124'. Then, print head 126' may deliver the binder in a pre-determined, two-dimensional pattern, to the layer of the powder spread across powder bed 124', to form a layer of one or more parts 134'. These steps may be repeated (e.g., with the pre-determined two-dimensional pattern for each respective layer) in sequence to form subsequent layers until, ultimately, the one or more parts 134' are formed in powder bed 124'.

Although the exemplary embodiment depicted in FIG. 1C depicts a single part 134' being printed, it should be understood that the powder bed 124' may include more than one part 134' in embodiments in which more than one part 134' is printed at once. Further, the powder print bed 124' may be delineated into two or more subsections 127, stacked vertically, with one or more objects disposed within each subsection.

As in FIG. 1B, build box subsystem 108 may comprise a build box actuator mechanism 138 that lowers powder bed 124 incrementally as each layer 127 of powder is distributed across powder bed 124. Accordingly, hopper 121, the one or more spreaders 122, and print head 126 may traverse build box subsystem 108 at a pre-determined height, and build box actuator mechanism 138 may lower powder bed 124 to form part 134.

Although not shown, binder jet fabrication subsystems 102 may include a coupling interface that may facilitate the coupling and/or uncoupling of the build box subsystems 108, 108' with the binder jet fabrication subsystems 102, 102', respectively. The coupling interface may comprise one or more of (i) a mechanical aspect that provides for physical engagement, and/or (ii) an electrical aspect that supports electrical communication between the build box subsystem 108, 108' to the binder jet fabrication subsystem 102, 102'.

It should be appreciated that the techniques herein may reference aspects of FIGS. 1A-1C (e.g., the binder jet fabrication subsystem 102, the powder bed 124, the print head 126, etc.). Any reference to systems or components in FIGS. 1A and 1B may also be applicable to corresponding components in FIG. 1C (e.g., reference numerals with corresponding prime (') designations). For example, references and descriptions to the binder jet fabrication subsystem 102 may also be applicable to the binder jet fabrication subsystem 102', references and descriptions to the powder bed 124 may also be applicable to the powder bed 124', and so on.

Binder jetting thin layers of powders (in particular, fine powders) at low or high speed may introduce defects, such as blisters (e.g., regions of trapped gas, trapped fluid, or powder and fluid rearrangement). Blisters may tend to be caused by surface tension effects, such as beading, which may cause one or more defects to protrude above the surface of the printed layer after deposition of binder). Binder jetting may also introduce defects such as regions of missing binder (e.g. due to one or more blocked binder discharge orifices), divots (e.g., regions where the step of spreading powder does not leave a smooth and uninterrupted powder surface, but instead leaves a depression, hole, or other region of "missing" powder), beading (e.g., surface-tension driven balling of binder or binder and powder on the powder bed), and/or smearing (e.g., regions where, during the step of spreading a new layer of powder, movement occurs in one or more underlying layers, causing distortion of the part), among others. The deposition of vapor on the powder bed, e.g., by vapor deposition device 150, may, in some embodiments, facilitate the spread of binder material 132 and reduce the occurrence of defects, such as beading of binder fluid and powder due to the above-described surface tension effects. However, when an excessive amount of vapor, or an excessive amount of binder fluid, or a combination of binder fluid and vapor, is deposited by vapor deposition device 150, binder material 132 may form blisters. Such blisters may be produced by air that becomes trapped beneath the binder and/or condensed vapor in the one or more layers of powder. Further, the deposition of an excessive amount of vapor may cause unwanted spreading of binder material 132 or "bleeding." When an inadequate amount of vapor is deposited, powder may lack cohesion and may become undesirably mobile. Such powder may be easily ejected (projected upward) when binder material 132 is deposited thereon, and may block or clog one or more discharge orifices 130. These blocked discharge orifices 130 may become unable to deposit binder, leading to one or more areas of powder bed 124 with missing binder, also referred to as a jets-out condition. Mobile powder may also experience surface tension effects during the deposition of binder resulting in rearrangement (beading) of the powder in the layer being printed, leading to a rough surface on the resulting printed parts; or leading to poor binder penetration into the powder bed resulting in parts without the desired strength; or leading to the printed layer protruding vertically above the next layer of powder, resulting in pushing of the printed part (e.g. smearing).

Additionally, spreading successive layers of powders at high speeds may introduce issues associated with non-uniform powder distribution and/or the inability of layers of powder to withstand the forces that may occur during printing (e.g., forces imparted by spreader 122). Insufficient metering of powder may produce areas that lack powder due to uneven distribution of the powder. Spreading of powder that is excessively cohesive may result in a transient "particle jamming" behavior inside the powder pile, where the powder particles temporarily transition from a free-flowing powder to a jammed or tightly packed body. When this jamming occurs, the powder jammed powder may not distribute into an even and uniform layer of powder, leaving a gap, hole, or divot in the deposited powder layer. If areas with an insufficient supply of powder become aligned (vertically), a hole or divot may become increasingly larger and/or deeper. Such divots may be present in a printed area (e.g., an area in which binder was deposited which forms a part), or a non-printed area (e.g., an area of powder which is not intended to form a part and one in which binder was not deposited). Divots, when present, may result in undesirable characteristics in the printed parts 134. For example, divots may create or cause voids or empty spaces within the part 134, which may adversely affect mechanical properties, such as ultimate strength, yield strength, toughness, or decreased elongation during mechanical tensile testing. Divots may also tend to introduce flaws on the surface of the part, including regions where desired features are not present or are incorrectly shaped, regions having increased surface roughness, or other undesirable surface characteristics.

Smearing may occur when a previously-printed layer shifts, cracks, or breaks apart. For example, smearing may occur if an excessive quantity of powder is spread, or when previously printed layers are unable to withstand the force of spreader 122. Smearing may also cause undesirable surface roughness on an exterior surface of part 134, particularly on downward-facing surfaces or overhangs. In some cases, smearing may introduce distortion of printed features, causing a part to fall outside of a specified dimensional tolerance.

One or more aspects of this disclosure may address one or more of the above issues.

FIGS. 2A, 2B, 4A, 4B, 6A, 6B, 8A, and 8B are schematic side views corresponding to a powder bed, e.g., of exemplary binder jet fabrication subsystem 102 and/or binder jet fabrication subsystem 102' and exemplary defects that may occur in powder bed 124 during binder jetting. In FIGS. 2A, 2B, 4A, 4B, 6A, 6B, 8A, and 8B, a horizontal direction X may correspond to an exemplary translation direction of spreader 122, 122'. A vertical direction Z orthogonal to the X-direction may correspond to a stacking direction along which layers of powder are formed. As discussed above and as shown in FIGS. 1B and 1C, binder jet fabrication subsystem 102, 102' may include at least one source of light, such as a source of low-angle light 180 or high-angle light 190, as well as one or more image capturing devices 174. In one aspect, at least one source of low-angle light 180 and at least one source of high-angle light 190 may be located within binder jet fabrication subsystem 102, 102'. In one aspect, the at least one source of low-angle light 180 and at least one source of high-angle light 190 may also be substantially isolated from exposure to the inside of the print environment (e.g. from powder) through the use of separating feature (e.g. transparent windows). These sources of light 180, 190 may each be operable to direct illumination in a direction toward powder bed 124, in which a three-dimensional object or part 134 may be manufactured in a layer-by-layer manner. Controller 128, 128' of the defect detection system, and other components of binder jet fabrication subsystem 102, 102' are omitted from FIGS. 2A, 2B, 4A, 4B, 6A, 6B, 8A, and 8B for clarity. Additionally, low-angle light source 180 is depicted in different positions in FIGS. 2B, 4B, 6B, and 8B as compared to FIGS. 2A, 4A, 6A, and 8A, for the purposes of clarity. However, it is to be understood that low-angle light source 180 may be provided in any suitable location in the binder jet printing subsystem 102, 102'.

Figure 2A:
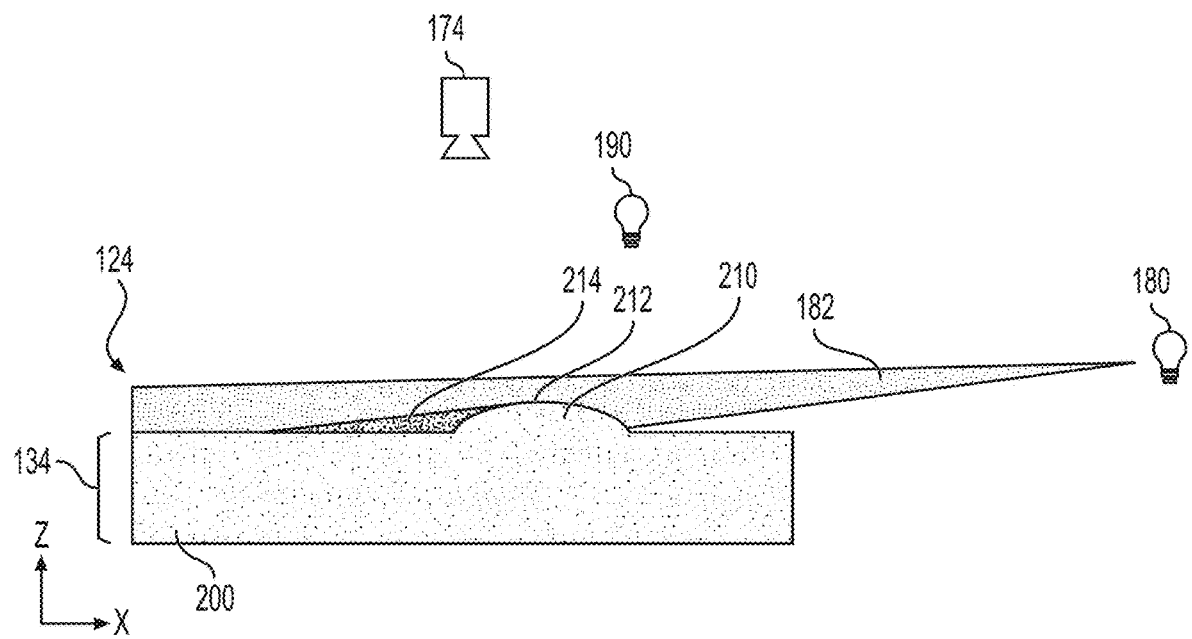
FIGS. 2A and 2B are schematic side views showing an exemplary powder bed of a binder jet fabrication subsystem with an exemplary defect and exemplary components of a defect detection system.
Figure 2B:
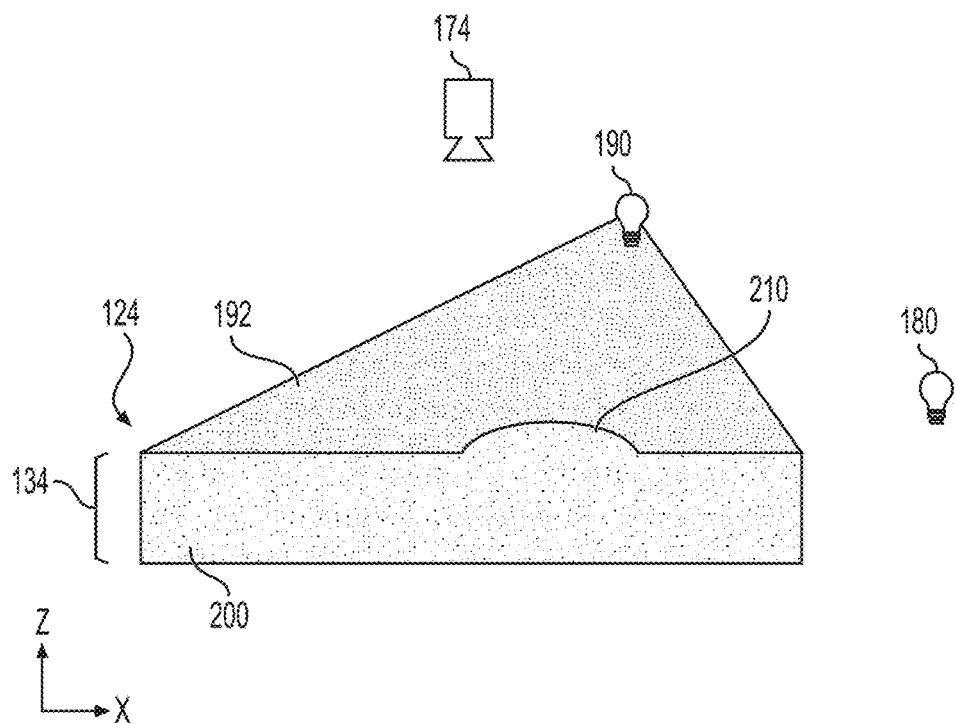

As can be seen in FIGS. 2A and 2B, low-angle light source 180 or high-angle light source 190 may be activated to generate and direct light toward powder bed 124 at a particular time. For example, as shown in FIG. 2A, low-angle light source 180 may be activated (e.g., by controller 128, 128') to generate and direct low-angle light 182 in a direction toward powder bed 124 (and one or more parts 134). When one or more blisters 210 are present on powder bed 124, the low-angle light 182 may create a blister shadow 214 that extends in a direction away from low-angle light source 180. Additionally, reflected low-angle light 182 (not shown in FIG. 2A) may have a sufficiently low angle with respect to powder bed 124 so as to create a blister bright spot 212 on the mound formed by blister 210, due at least in part to the potentially non-uniform shape that blister 210 may have. As can be seen in FIG. 2A, a region 200 of powder bed 124 substantially free of defects due to powder spreading or vapor deposition may not create a shadow or bright spot. As can be seen in FIG. 2B, when high-angle light source 190 is activated and generates high-angle light 192, the position of this light source 190 with respect to blister 210 may not result in the creation of a blister shadow 214, although, high-angle light source 190 may be used to detect the presence of blisters 210 having certain sizes and/or shapes. Thus, low-angle light 182 may be particularly suitable for creating blister shadows 214 when one or more blisters 210 are present.

Figure 3A:
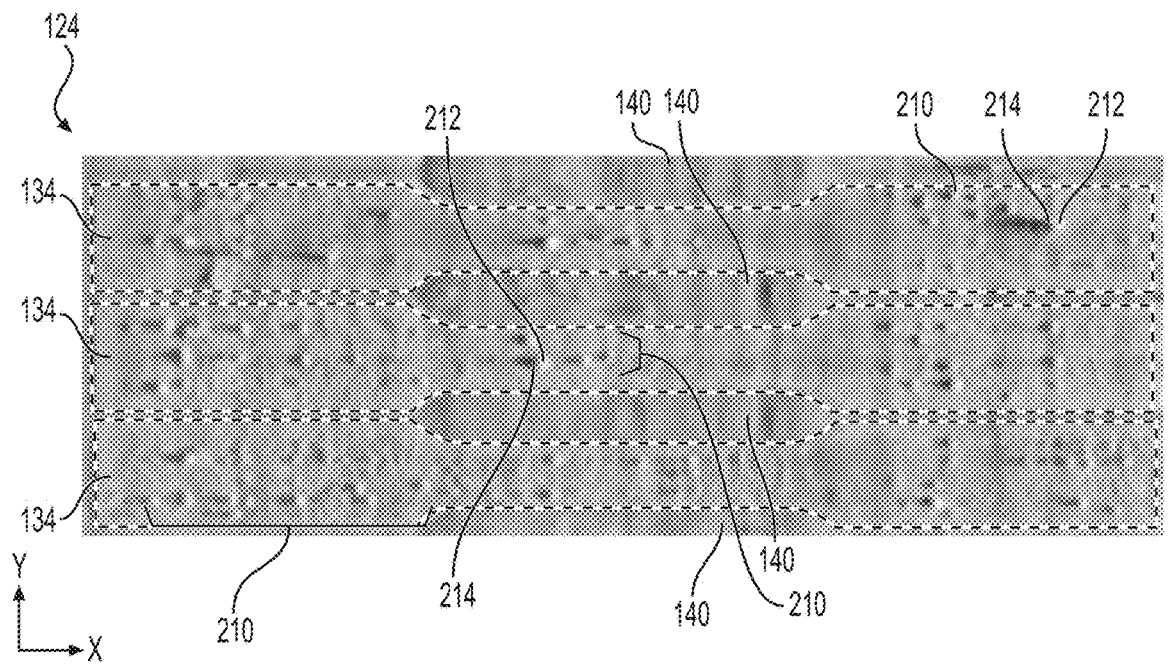
FIGS. 3A and 3B are top views of the powder bed of FIGS. 2A and 2B as imaged by the defect detection system.
Figure 3B:
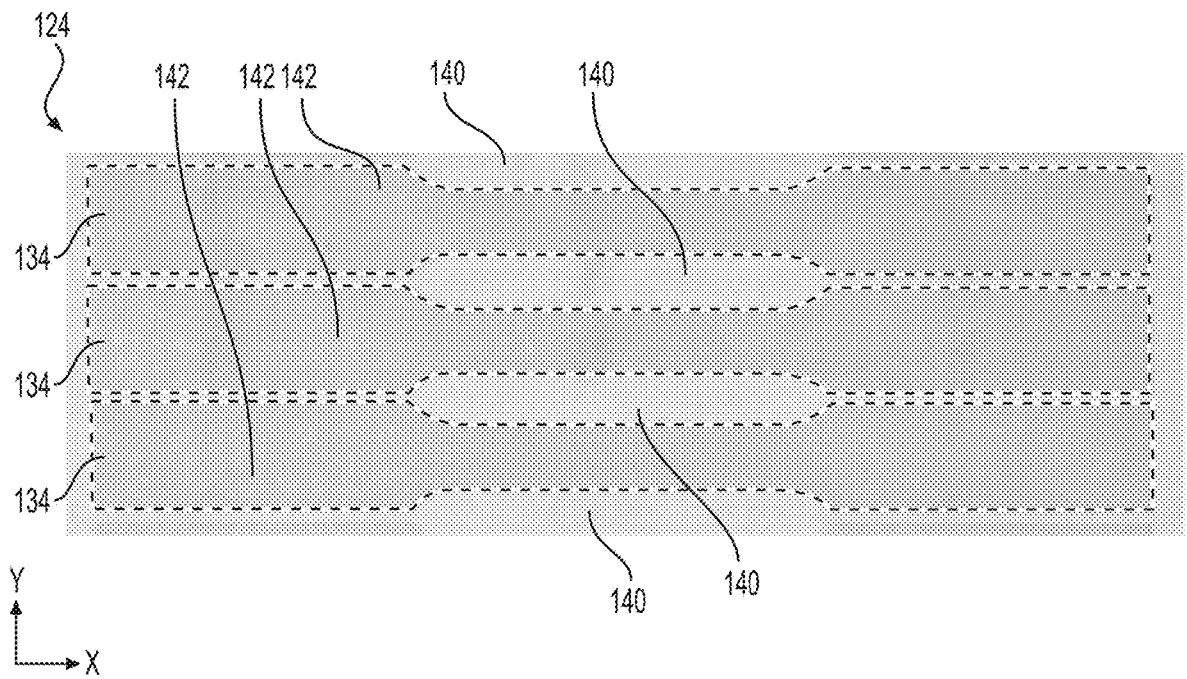

FIGS. 3A and 3B are exemplary top views of powder bed 124 from the perspective of image capturing device 174 when low-angle light 182 or high-angle light 192 is respectively directed onto powder 124 in the manner shown in FIGS. 2A and 2B, respectively. In FIGS. 3A and 3B (and FIGS. 5A, 5B, 7A, 7B, 9A, 9B, 10A, and 10B), the horizontal direction X may correspond to the translation direction of spreader 122, 122'. The Y-direction may be a horizontal direction orthogonal to the X-direction, as described above. FIG. 3A shows a top view of a portion of powder bed 124 on which a plurality (e.g., three) exemplary parts 134 are being formed, e.g., by binder jet fabrication subsystem 102 or 102'. FIGS. 3A and 3B show the same parts 134 under different lighting conditions. FIGS. 3A and 3B may correspond to a portion of a field of view of image capturing device 174 or the entire field of view of image capturing device 174.

As can be seen in FIG. 3A, a plurality of parts 134 may be formed within areas of powder bed 124 on which binder fluid or binder material 132 has been deposited. A remainder of powder bed 124 may include binder-free or unbound powder 140. In one aspect, unbound powder 140 may have a different, e.g., darker, appearance in an image captured under low-angle light 182 (may reflect less light) as compared to the binder-containing parts 134 formed by bound powder 142 when low-angle light 182 is directed toward powder bed 124.

FIG. 3A illustrates a number of blisters 210 present on powder bed 124. When low-angle light 182 encounters a blister 210, the blister 210 may create a blister bright spot 212 that corresponds to a mound of the blister 210. In one aspect, the blister bright spot 212 may be brighter than an area surrounding blister 210 and/or brighter than an average brightness of a top layer of powder bed 124. Additionally, each blister 210 may cast a blister shadow 214 that extends away from low-angle light source 180 (FIG. 2A). Thus, each blister 210 may present a blister bright spot 212 and an adjacent (contiguous) blister shadow 214, which can be detected using image capturing device 174, as is shown in FIG. 3A. Blisters 210 may be identified or differentiated from other types of defects based on the circularity of e.g. blister bright spot 212, which compares the perimeters of the defect to a circle of the same area. For example, a circularity of approximately 1 may be indicative of a blister 210, while a lower circularity may indicate the presence of another defect. Additionally or alternatively, blisters 210 may be detected or differentiated from other defects based on a measure of the aspect ratio of the of defect—e.g., a defect that is significantly longer in the y direction than in x (or vice versa) is unlikely to be a blister.

To accomplish this, first the image captured using the image capturing device 174 and low angle light 182 is transformed using a homography matrix to align key points in the image to the actual image sent to the print electronics 126. The resulting image is then broken down into regions of interest (ROI) that can then be processed sequentially individually for detect, either sequentially, or alternatively in parallel.

To detect blistering, each ROI is then scanned using a blob detection algorithm. This will provide areas on interest (AOI) to more closely inspect. Each AOI is inspected for circularity, inertia, and convexity. An object that has a circularity and inertia of approximately 1, will be flagged as a potential blister. If a significant amount of blistering is found in a region, corrective action may be taken as outlined in the present disclosure.

FIG. 3B may correspond to a portion or entirety of an image captured by image capturing device 174 when high-angle light source 190 generates high-angle light 192 in the manner shown in FIG. 2B. As can be seen in FIG. 3B, each of the parts 134 may reflect less of the high-angle light 192 toward image capturing device 174 so as to form relatively dark portions of powder (e.g., due to the presence of binder, or due to different surface texture imparted by the binder deposition process). Regions of powder bed 124 including unbound powder 140 may reflect more of the high-angle light 192, so as to form relatively light portions of powder bed 124. In one aspect, blisters 210, blister bright spots 212, and/or blister shadows 214 may be difficult to observe or detect when high-angle light 192 is directed toward powder bed 124.

Figure 4A:
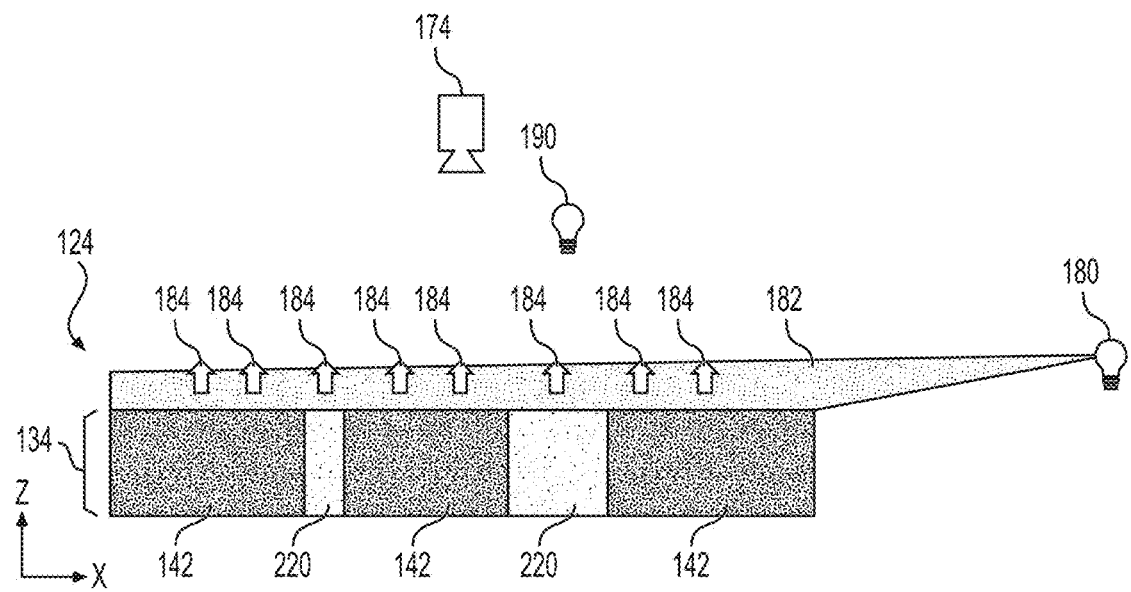
FIGS. 4A and 4B are schematic side views showing an exemplary powder bed of a binder jet fabrication subsystem with another exemplary defect and exemplary components of a defect detection system.
Figure 4B:
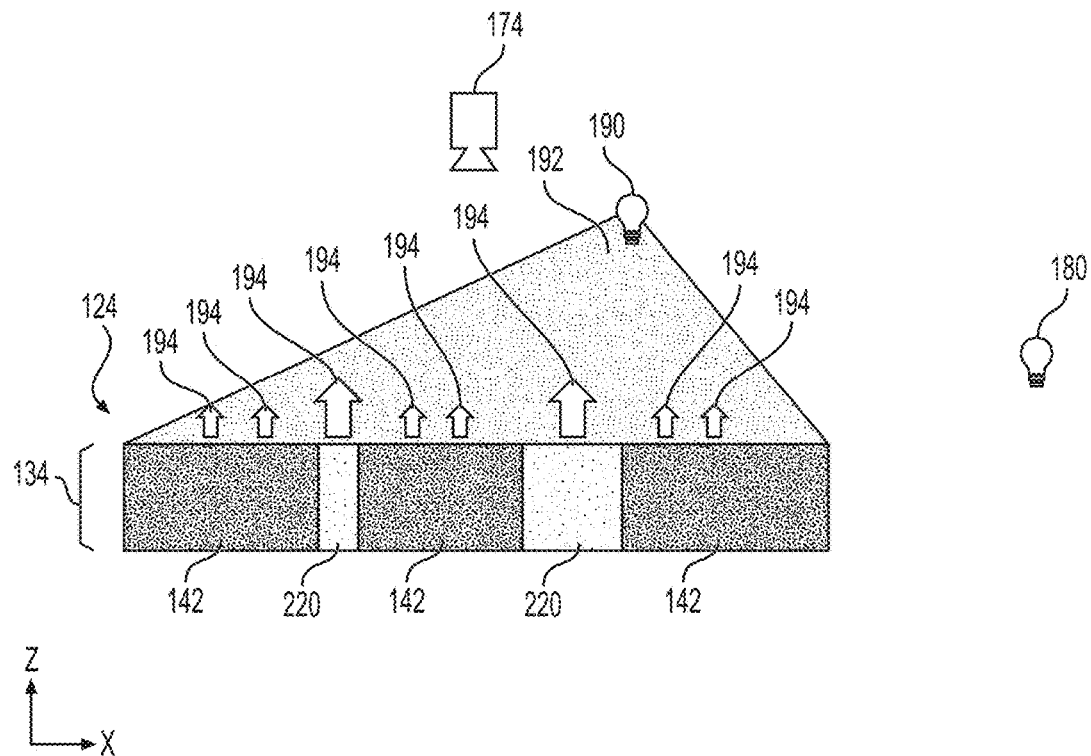

FIGS. 4A and 4B illustrate exemplary lighting conditions under low-angle and high-angle light, respectively, for detection of one or more missing binder (jets-out condition) defects 220 in powder bed 124. FIG. 4A illustrates low-angle light 182 from low-angle light source 180 directed toward powder bed 124. In FIGS. 4A and 4B, part 134 includes regions of bound powder 142, as well as regions of missing binder 220 (which may be formed by unbound powder 140 located on portions of part 134). These regions may reflect the low-angle light 182 toward image capturing device 174.

When low-angle light 182 is directed toward regions of missing binder (jets-out condition) 220 and regions of bound powder 142, the reflected low-angle light 184 may tend to be directed in a substantially uniform manner toward image capturing device 174, as represented in FIG. 4A. Observation or detection of missing binder 220 may be difficult when light is reflected in this manner. However, when high-angle light 192 is directed toward regions of missing binder 220 and bound powder 142 of part 134, as shown in FIG. 4B, light may tend to be more readily absorbed by bound powder 142 as compared to unbound powder 140, creating lighter and darker areas of powder. Thus, regions of missing binder 220 may be identified or detected by the greater amount of high-angle light 194 reflected by the regions of missing binder 220, which may appear as lighter regions in images captured by image capturing device 174. As understood, FIGS. 4A and 4B illustrate regions of bound powder 142 and missing binder 220 for ease of illustration. However, a cross-sectional view taken in a plane extending parallel to the X-direction (e.g., the view of FIGS. 4A and 4B), may include only missing binder 220 or only bound powder 142.

Figure 5A:
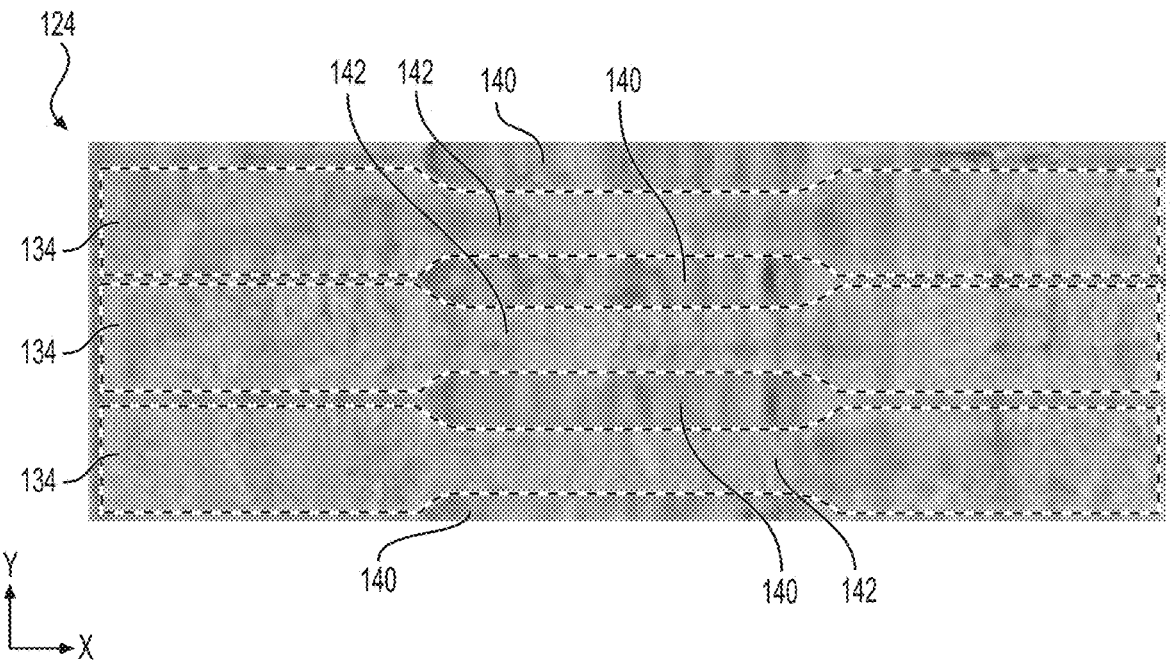
FIGS. 5A and 5B are top views of the powder bed of FIGS. 4A and 4B as imaged by the defect detection system.
Figure 5B:
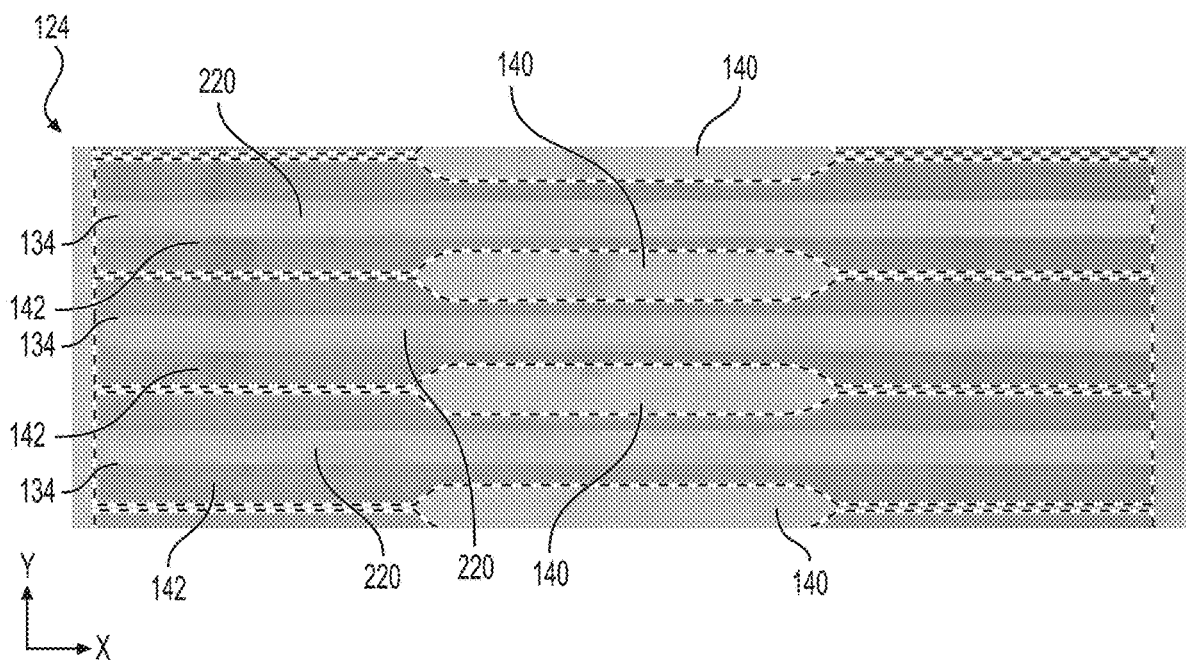

FIGS. 5A and 5B are exemplary top views from the perspective of image capturing device 174, according to FIGS. 4A and 4B, respectively. FIGS. 5A and 5B may correspond to a portion of the field of view of image capturing device 174. As shown in FIG. 5A and described above, when low-angle light 182 is directed toward parts 134 on powder bed 124, regions of missing binder (jets-out condition) 220 within part 134 may be imperceptible or difficult to detect. However, when high-angle light 192 is directed toward the same powder bed 124 and parts 134, the missing binder 220 (which amounts to the presence of unbound powder) within one or more parts 134 may be readily discerned or detected as lighter regions within parts 134. This may occur, at least in part, due to a larger amount of high-angle light 192 being reflected by the unbound powder (FIG. 4B). In one aspect, the regions of unbound powder 140 forming missing binder 220 may be formed in substantially linearly-extending streaks or lines. These lines may extend in a direction approximately aligned with a direction of motion of print head 126. For example, unbound powder 140 and the corresponding lighter areas of part 134 may be formed due to one or more blocked discharge orifices 130, 130', which may prevent binder material 132 from being deposited in the regions of missing binder 220.

To accomplish this, first the image captured using the image capturing device 174 and high angle light 190 is transformed using a homography matrix to align key points in the image to the actual image sent to the print electronics 126. This resulting image now has the same scale as the image printed and each pixel of the image represents one jet on the printhead electronics. This can be used to identify the specific printhead, or nozzle that ejects each drop.

The resulting image is then thresholded at a material specific value to differentiate areas where there is bound powder on the print bed to areas where there is only unbound powder. The thresholded image is then compared directly to the actual image on a pixel-wise basis along each row. If there are a significant number of pixels that have unbound powder in a row compared to the actual image, then that row is said to have jets out. If multiple rows of sequential jets out are detected, corrective actions may be taken.

Figure 6A:
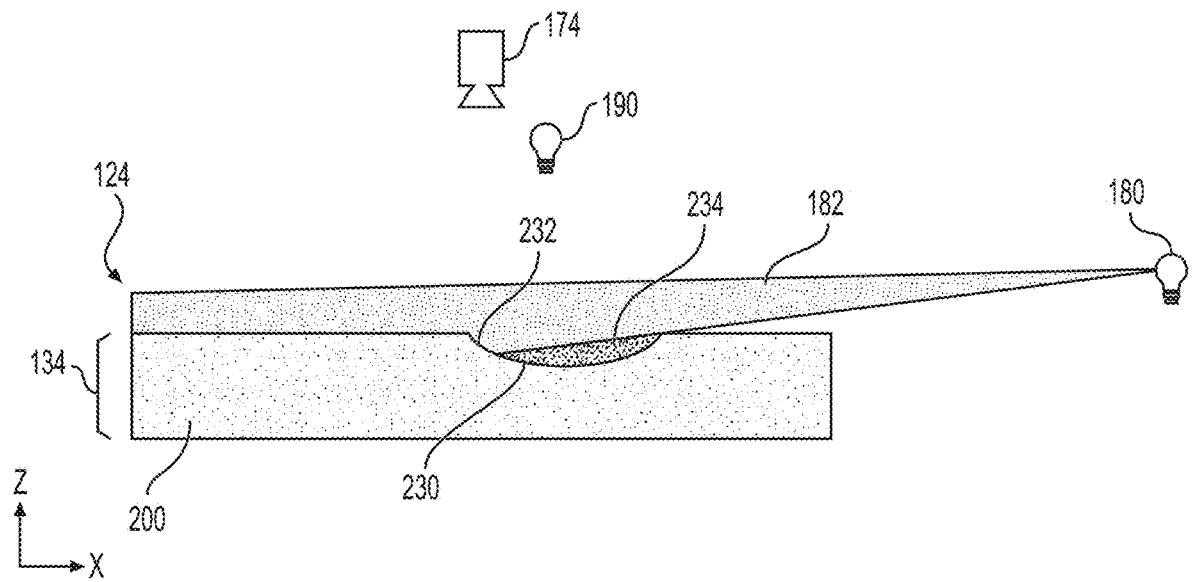
FIGS. 6A and 6B are schematic side views showing an exemplary powder bed of a binder jet fabrication subsystem with another exemplary defect and exemplary components of a defect detection system.
Figure 6B:
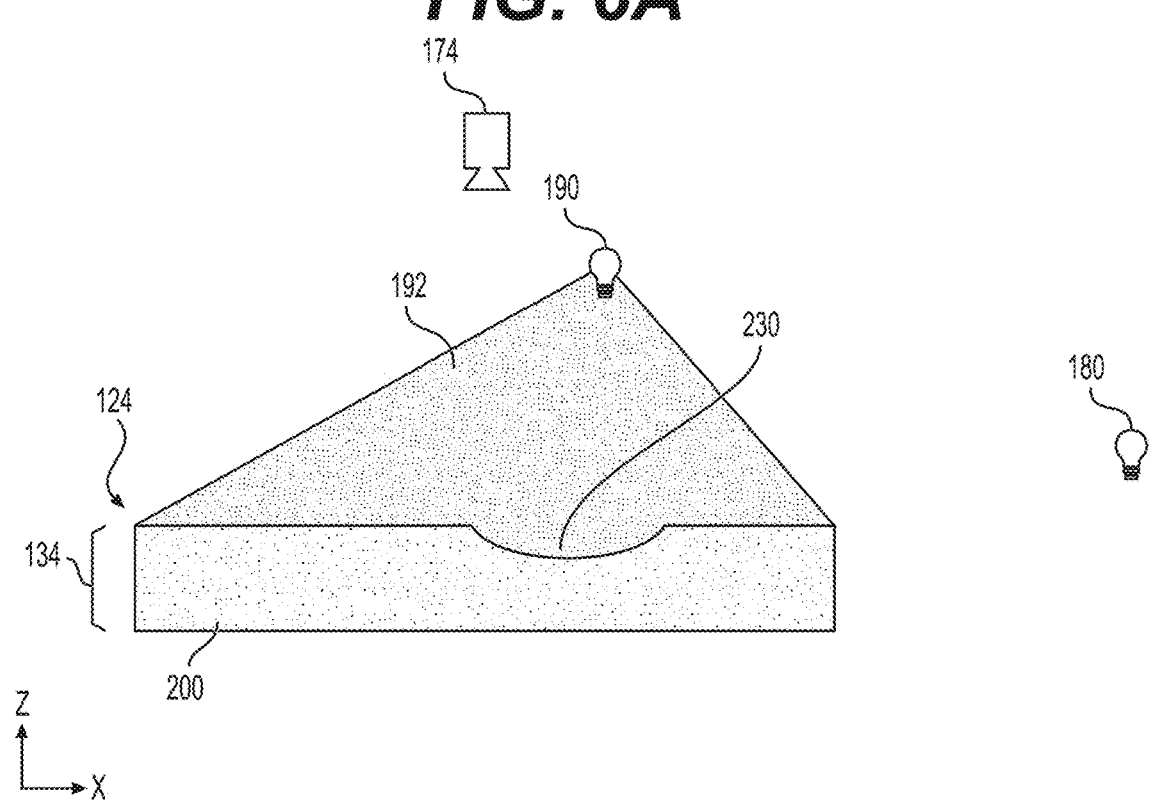
Figure 7A:
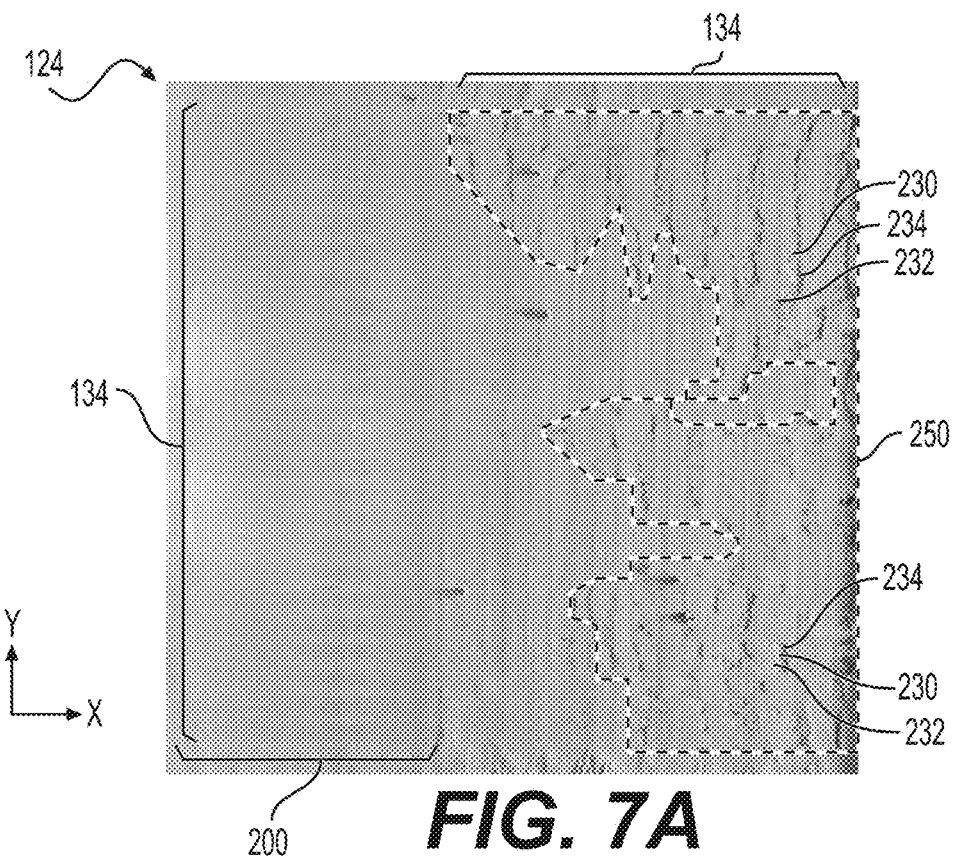
FIGS. 7A and 7B are top views of the powder bed of FIGS. 6A and 6B as imaged by the exemplary defect detection system.
Figure 7B:
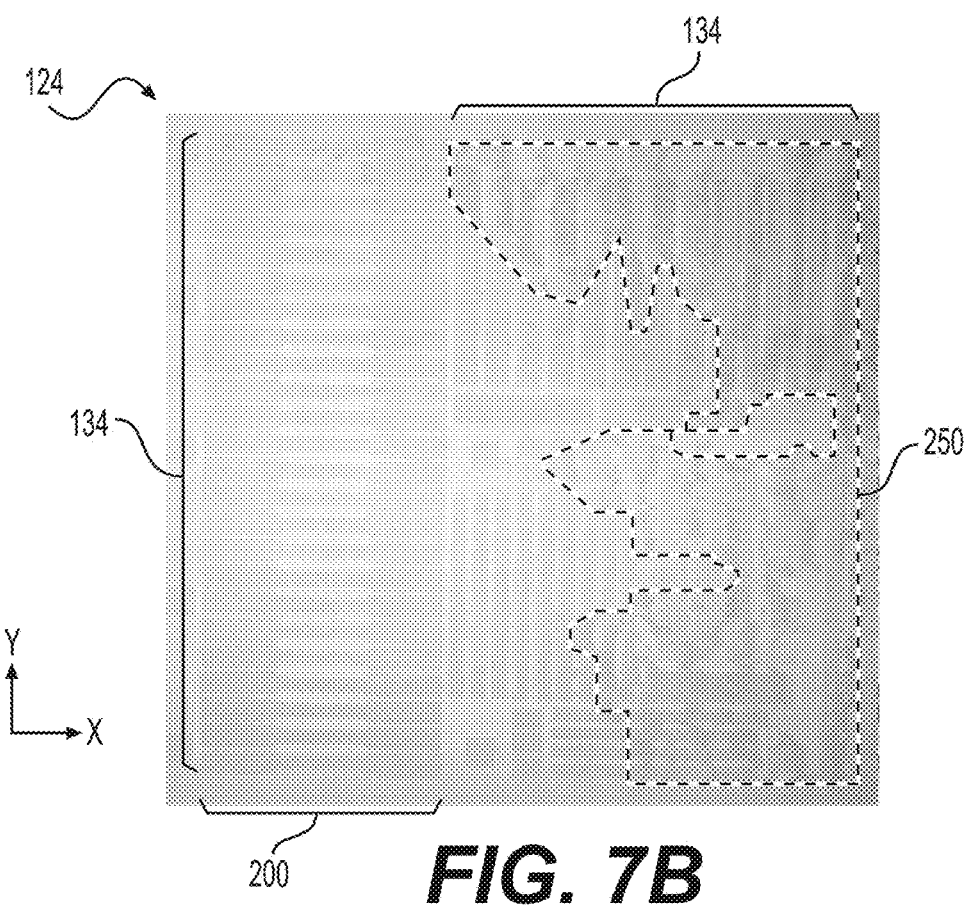

Alternatively, if there is a pixel that is shown to have bound powder in the captured image but the printed image shows there should be no binder present, bleeding is indicated. Small amounts of bleeding are expected as binder migrates in the print bed, but if a ROI contains large amounts of bleeding, as calculated by comparing the number of pixels containing bleeding vs the area printed, corrective action can be taken. FIGS. 6A and 6B illustrate exemplary lighting conditions for detection of one or more cavity or divot defects 230 in powder bed 124. FIG. 6A illustrates low-angle light 182 from low-angle light source 180 directed toward a part 134 containing a divot 230. The low-angle light 182 may have a sufficiently low angle such that at least a portion of divot 230 casts a shadow 234 and remains relatively dark in comparison to the powder immediately surrounding divot 230. In one aspect, divot 230 may form a divot bright spot 232 at an end of divot 230 farthest from low-angle light source 180. In one aspect, divot bright spot 232 may be brighter than an average brightness of a top layer of powder bed 124. Divot shadow 234 may be caused by blocked low-angle light 182, and may be closer to the low-angle light source 180 than a corresponding divot shadow 234. In contrast, a blister 210 may form a blister bright spot 212 closer to low-angle light source 180 as compared to a corresponding blister shadow 214. In one aspect, divot shadow 234 may be formed in a majority of divot 230, and may extend outward from an end portion of divot 230 closest to low-angle light source 180. In contrast to divot 230, regions 200 may be substantially free of shadows and bright spots. As shown in FIG. 6B, high-angle light 192 directed toward a part 134 containing one or more divots 230 may produce shadows and bright spots that are less pronounced as compared to the divot bright spots 232 and shadows 234 when low-angle light source 180 is employed to illuminate part 134. Thus, while it may be possible to discern or detect divots 230 with the use of high-angle light 192, low-angle light 182 may facilitate more accurate identification of one or more divot defects 230, as can be seen in FIGS. 7A and 7B. One or more regions 200 may be substantially free of shadows or bright spots.

To accomplish this, first the image captured using the image capturing device 174 and low angle light 182 is transformed using a homography matrix to align key points in the image to the actual image sent to the print electronics 126. The resulting image is then broken down into regions of interest (ROI) that can then be processed sequentially individually for detect, either sequentially, or alternatively in parallel.

To detect divots, each ROI is then scanned using a blob detection algorithm. This will provide areas on interest (AOI) to more closely inspect. Each AOI that is darker than the surrounding powder bed is inspected for circularity, inertia, and convexity. Divots, in general, have lower circularity and inertia (<0.8). In addition, there will be a bright spot adjacent to the defect. If that spot is further from the side light 182, it indicates that the defect is below the print surface and is likely a divot. If the bright spot is between the defect and the side light 182, it indicates a defect that occurs above the print surface, such as smearing. If a significant amount of blistering is found in a region, corrective action may be taken.

FIGS. 7A and 7B are exemplary top views of powder bed 124 from the perspective of image capturing device 174, according to FIGS. 6A and 6B, respectively. FIGS. 7A and 7B may illustrate an entirety or a portion of the field of view of image capturing device 174. In one aspect, this field of view may cover an entirety or substantially an entirety of powder bed 124, or this field of view may cover only a portion of powder bed 124.

In the powder bed 124 shown in FIG. 7A, a plurality of divots 230 may form one or more defect-containing regions 250. While divots 230 may form at any location within powder bed 124, divots 230 may tend to form within a part 134. Each of these divots 230 may form a divot bright spot 232 and a divot shadow 234, which are most clearly identified with the use of low-angle light source 180, as shown in FIG. 7A. However, as can be seen in FIG. 7B, each divot 230 may also be observed or detected by dark portions or shadows present in powder bed 124, although these may be more subtle to detect. In at least some embodiments, one or more divots 230 may be identified based on a ratio of the length to width of a potential divot (e.g., a ratio of the length to width of shadow 234 with or without bright spot 232). For example, a divot may be identified based on a ratio (e.g., aspect ratio) of about 1:1 of bright to dark regions. Divots 230 may be identified based on the contrast or sharpness of the potential defect. For example, a divot 230 may be characterized by softer or smoother transitions between dark regions (e.g., divot shadows 234) and light regions (e.g., divot bright spots 232). By contrast, a smearing defect may have a sharper dividing line (e.g., higher contrast, higher sharpness) between light and dark regions.

Figure 8A:
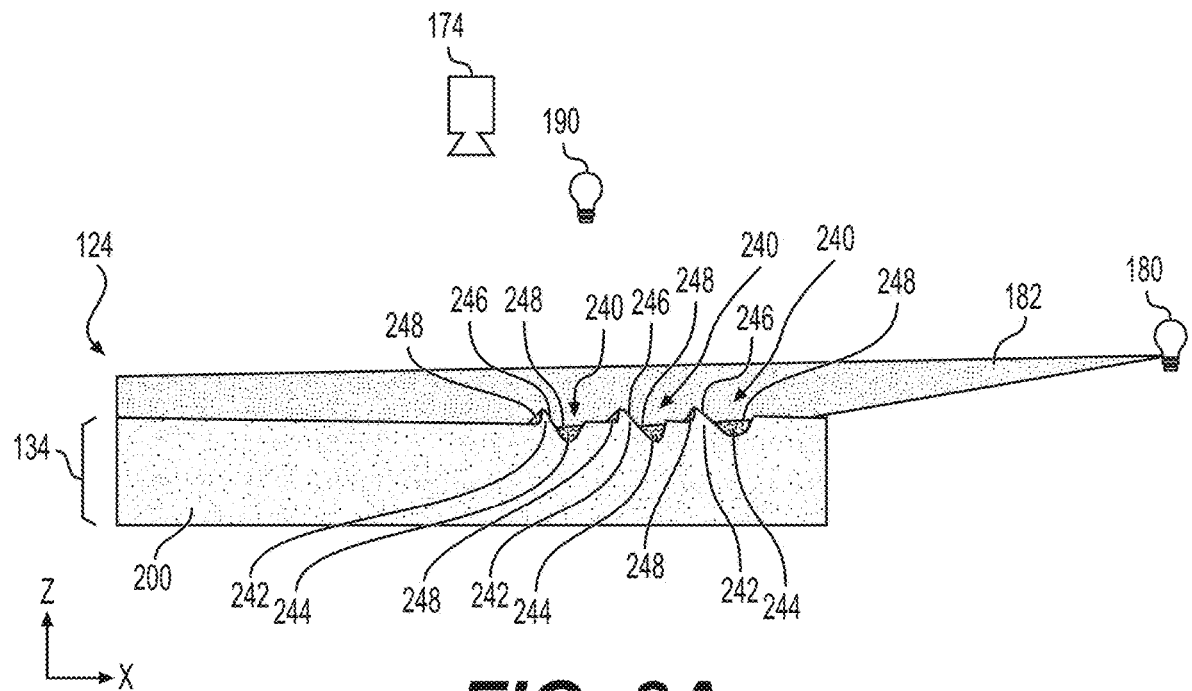
FIGS. 8A and 8B are schematic side views showing an exemplary powder bed of a binder jet fabrication subsystem with another exemplary defect and exemplary components of a defect detection system.
Figure 8B:
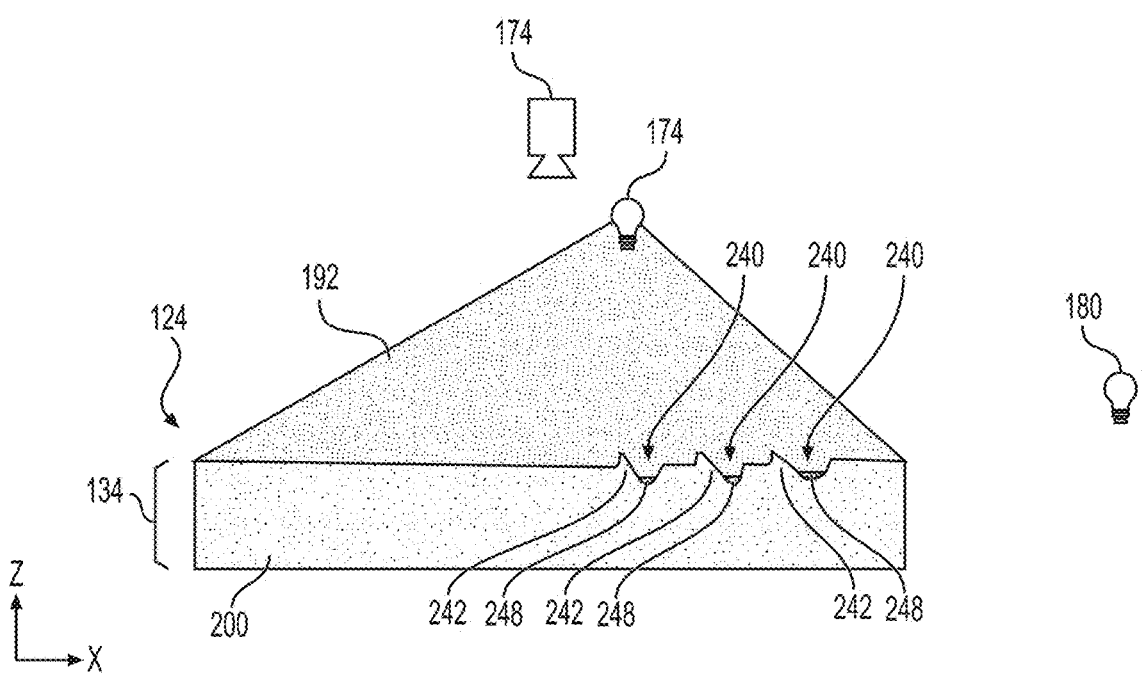

FIGS. 8A and 8B illustrate exemplary lighting conditions under low-angle and high-angle light, respectively, for detection of one or more cracking or smearing defects in powder bed 124. FIG. 8A illustrates low-angle light 182 from low-angle light source 180 directed toward a part 134 containing a smear 240. Each smear 240 may include a raised portion 242 that extends above a level of powder region 200 (which may be substantially free of defects due to powder spreading or binder deposition), and an adjacent recessed portion 244 that extends below the level of the deposited powder region 200. During the application of low-angle light 182, each raised portion 242 may reflect an increased amount of light so as to form a smear bright spot 246 and a darkened portion or smear shadow 248 farther from low-angle light source 180. In one aspect, smear bright spots 246 may be brighter than an average brightness of a top layer of powder bed 124. Each recessed portion 244 may also form a smear shadow 248. As can be seen in FIG. 8B, smears 240 may also form dark portions or shadows 248 in powder bed 124 upon application of high-angle light 192. Smear shadows 248 may be formed when smears 240 create sufficiently deep cracks. Walls of these cracks may be angled so as to reflect light away from image capturing device 174 or further into the crack, effectively trapping the light within the crack, resulting in a shadow 248. These smear shadows 248, formed by the application of high-angle light 192, may have an appearance similar to a series of cracks and may be thinner as compared to smear shadows 248 produced by low-angle light 182. One or more regions 200 may be substantially free of shadows or bright spots. Smears 240 may also be identified based on the contrast or sharpness of the potential defect. For example, a smear 240 may have a sharper dividing line (e.g., a high-contrast, high-sharpness line) between dark regions (e.g., smear shadows 248) and light regions (e.g., smart bright spots 246). Thus, smears 240 may be differentiated from divots 230, which may have relatively softer or smoother transitions between dark and light regions, as described above.

To accomplish this, first the image captured using the image capturing device 174 and low angle light 182 is transformed using a homography matrix to align key points in the image to the actual image sent to the print electronics 126. The resulting image is thing broken down into regions of interest (ROI) that can then be processed sequentially individually for detect, either sequentially, or alternatively in parallel.

To detect smearing, each ROI is then scanned using a blob detection algorithm. This will provide areas on interest (AOI) to more closely inspect. Each AOI that is darker than the surrounding powder bed is inspected for circularity, inertia, and convexity. Smearing, in general, have low circularity and inertia (<0.5). In addition, there will be a bright spot adjacent to the defect. If that spot is between the defect and the side light 182, it indicates that the defect is above the print surface. If this defect is in an area in the print bed where we expect bound powder, the defect is classified as smearing and corrective action outlined <somewhere else in the document> can be performed.

Figure 9A:
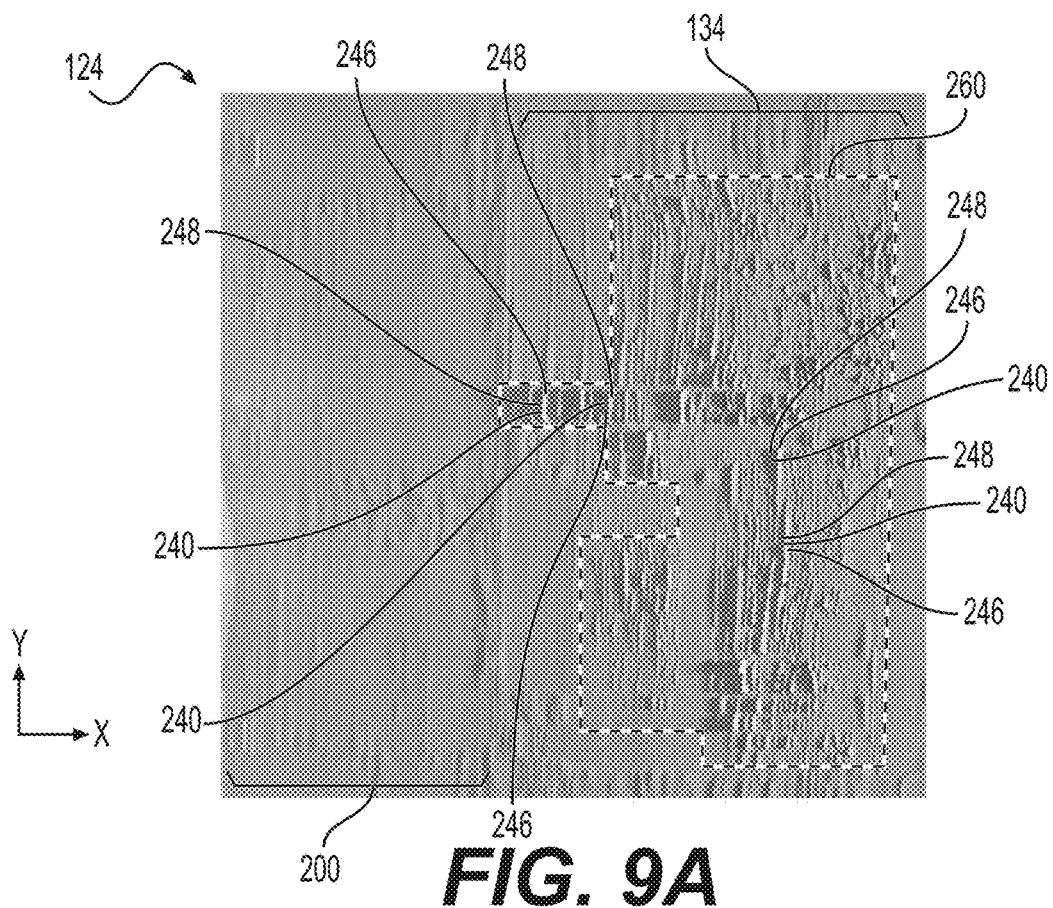
FIGS. 9A and 9B are top views of the powder bed of FIGS. 8A and 8B as imaged by the exemplary defect detection system.
Figure 9B:
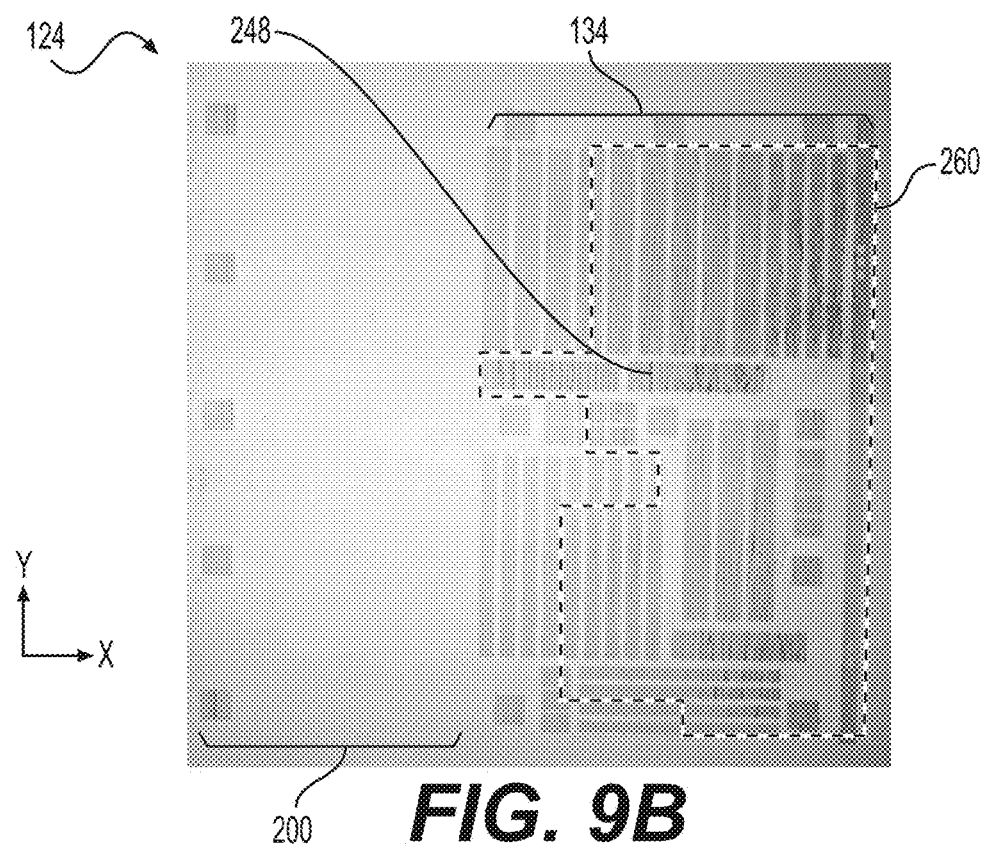

FIGS. 9A and 9B are exemplary top views from the perspective of image capturing device 174 according to the lighting conditions of FIGS. 8A and 8B, respectively. Like FIGS. 7A and 7B, FIGS. 9A and 9B may correspond to an entirety or substantially an entirety of the field of view of image capturing device 174, or a portion of the field of view.

In the exemplary powder bed 124 shown in FIG. 9A, a plurality of smears 240 may form one or more smear-containing regions 260. While smears 240 may form at any location within powder bed 124, smears 240 may tend to form within parts 134. When smear bright spots 246 are formed by the application of low-angle light 182, each smear bright spot 246 may be located adjacent to one or more smear shadows 248. Thus, the presence of smearing may be observed or detected based on the presence of a series of bright portions or bright spots 246 and a series of dark portions or shadows 248. In at least some embodiments, one or more smears 240 may be identified based on a ratio of the length to width of a potential smear (e.g., a ratio of the length to width of shadow 248 with or without bright spot 246, or a ratio of the length to the width of bright spot 246). For example, a smear may be identified (e.g., by controller 128, 128') based on a ratio (e.g., aspect ratio) of about 10:1. The aspect ratio of smear shadows 248 may depend, at least in part, on the angle of the low-angle light. Additionally, the presence of multiple smears 240 in close proximity to one another may cause one smear shadow 248 to interrupt the smear bright spot 246 or smear shadow 248 of an adjacent smear 240. When this occurs, the aspect ratio of the shadow to the bright spot may not conform to an expected aspect ratio for a smear 240. Such smears 240 may instead be identified, for example, based the distance between adjacent bright spots 246 and shadows 248. This distance may be measured along a direction towards the low-angle light source 182.

Figure 14A:
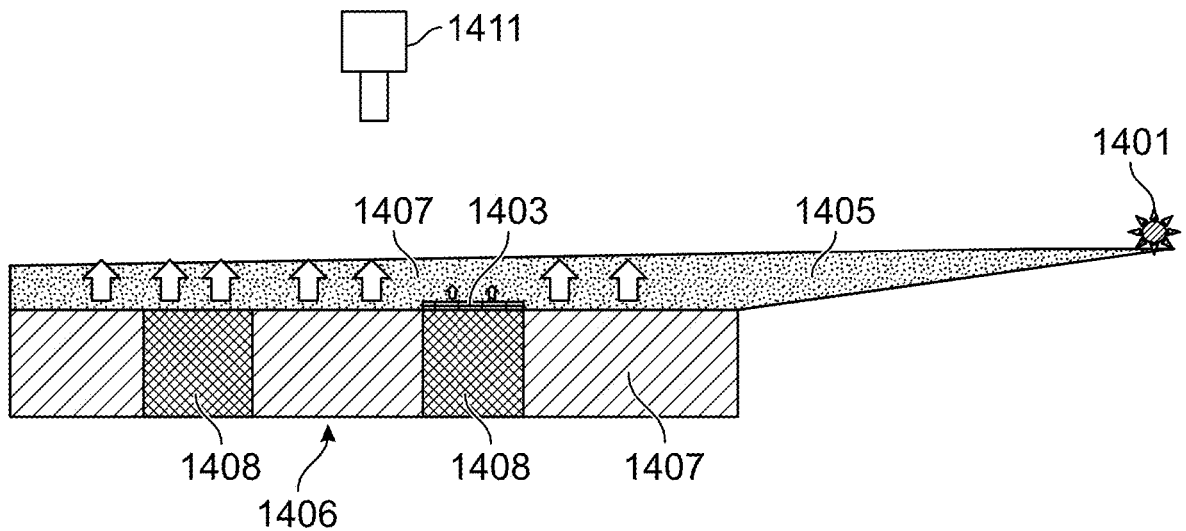
FIGS. 14A-B is a schematic side view showing an exemplary powder bed of a binder jet fabrication subsystem with an exemplary defect and exemplary components of a defect detection system.
Figure 14B:
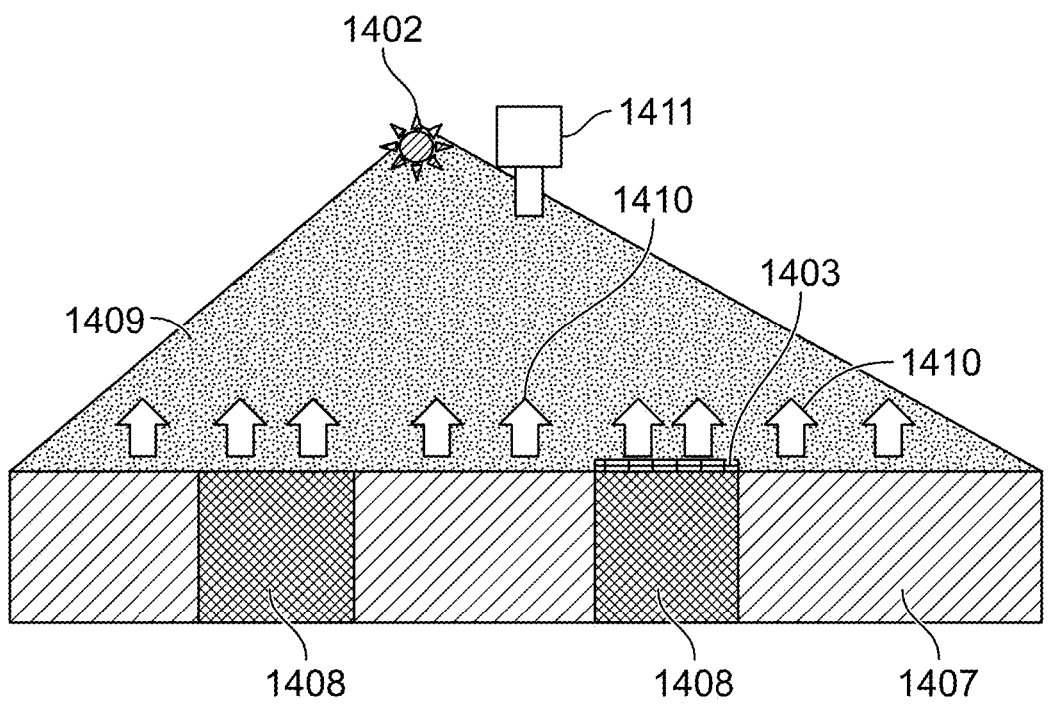

FIGS. 14A-B illustrate exemplary lighting conditions under low-angle light source 1401 and high-angle light source 1402, respectively, for detection of one or more beading defects 1403 in powder bed 1404. FIG. 14A illustrates low-angle light 1405 from low-angle light source 1401 directed toward a part 1406 containing a beading defect 1403 in a region of the deposited binder 1408. Each beading defect 1403 may include a portion containing a rough or textured region. During the application of low-angle light 1405, each textured portion of the beading defect 1403 may reflect a decreased amount of light (i.e. a darker region 1406) relative to a part without a beading defect, or relative to a region of unbound powder 1407. The darker region may be substantially uniform in intensity. During the application of high-angle light, a region containing a beading defect 1403 may reflect substantially the same amount of light as a region of a part not containing a beading defect. As can be seen in 14B, when high-angle light source 1402 is activated and generates high-angle light 1409, the position of this light source 1402 with respect to beading 1403 may not result in the creation of a dark region in reflected light 1410, although, high-angle light source 1403 may be used to detect the presence of beading 1403 having certain sizes and/or shapes. Thus, low-angle light 1409 may be particularly suitable for detecting beading dark regions when beading defects are present.

FIGS. 15A-B are exemplary top views from the perspective of image capturing device 1411 according to the lighting conditions of FIGS. 14A and 14B, respectively. Like FIGS. 7A and 7B, FIGS. 15A and 15B may correspond to an entirety or substantially an entirety of the field of view of image capturing device, or a portion of the field of view. Each image is of the same print bed in which a series of parts having cubic cross sections approximately 15 mm wide are being fabricated. Certain of the parts have beading defects 1501 whereas others do not.

In the powder bed shown in FIG. 15A, a plurality of beading defects 1501 may form one or more defect-containing regions. Each of these beading defects 1501 may form a dark region, which is most clearly identified with the use of low-angle light source 1401, as shown in FIG. 14A. Beading defects 1501 may be identified based on the contrast or sharpness of the potential defect. For example, a beading defect 1501 may be characterized by a uniform brightness within a beading defect region. By contrast, a smearing defect may have a sharper dividing line (e.g., higher contrast, higher sharpness) between light and dark regions.

To accomplish this, first the image captured using the image capturing device 174 and low angle light 182 is transformed using a homography matrix to align key points in the image to the actual image sent to the print electronics 126. This resulting image now has the same scale as the image printed and each pixel of the image represents one jet on the printhead electronics. The resulting image is them broken down into ROI based on image size.

Thresholding is then applied locally to each ROI of the image. The image is then compared to the original image. If bound powder is visible in both the thresholded image and the actual image printed, there is beading in the area. If significant beading is present, the process parameters defined below can be applied.

Although FIGS. 3A, 3B, 5A, 5B, 7A, 7B, 9A, 9B, 10A, 10B, 15A-15B, show a single type of defect at a time for the purpose of explanation, an image captured by image capturing device 174 may show multiple defect types in a single image. These defects may be present in any combination and in any location of powder bed 124. The defect detection system described herein may facilitate the identification of each defect when multiple defect types are present.

Figure 10A:
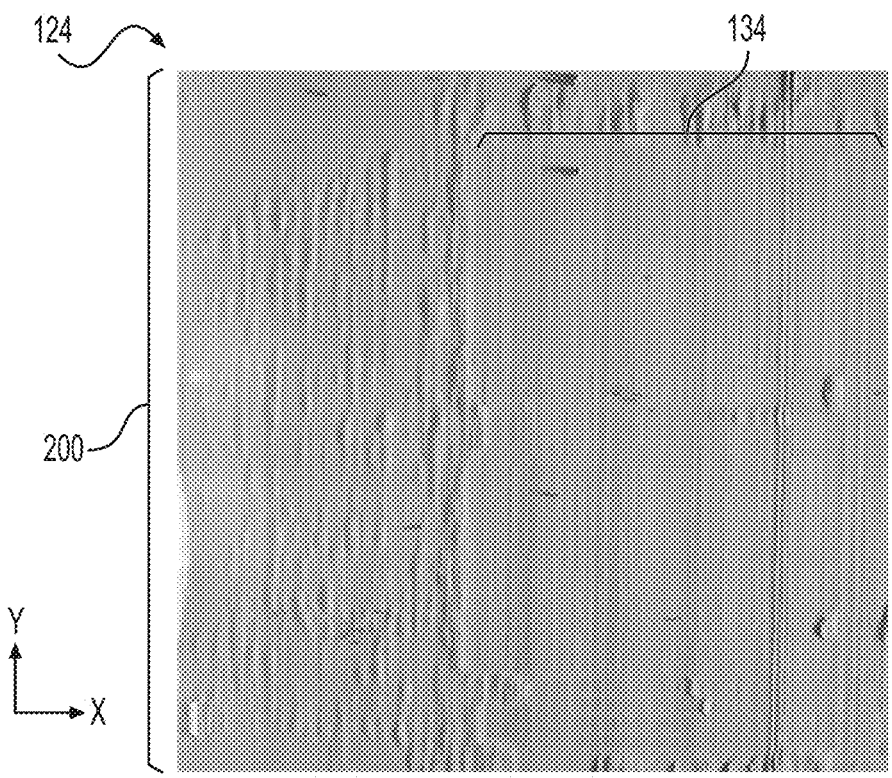
FIGS. 10A and 10B are top views of an exemplary portion of a defect-free powder bed as imaged with the exemplary defect detection system.
Figure 10B:
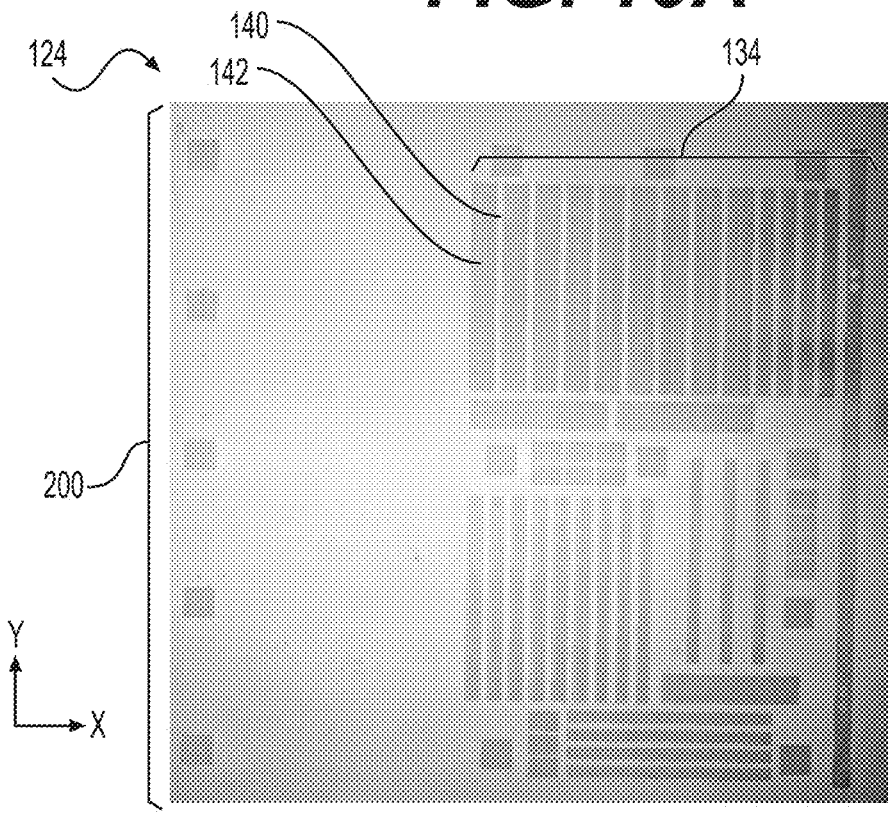

FIGS. 10A and 10B are exemplary top views from the perspective of image capturing device 174 showing an exemplary powder bed 124 in which a plurality of parts 134 are being manufactured within binder jet fabrication subsystem 102, 102'. FIGS. 10A and 10B may correspond to powder bed 124 and parts 134, respectively, produced by adjusting one or more printing parameters, as described below. By adjusting one or more printing parameters in response to the initial detection of any one or more of the printing defects described herein, an entirety of powder bed 124 may be formed with powder regions 200 that are substantially free of defects due to powder spreading or binder deposition or that contain relatively fewer defects. Similarly, each of the parts 134 may be substantially free of defects or may have relatively fewer defects. Additionally, the boundaries between regions of bound powder 142 and unbound powder 140 may be clear and readily detected and observed.

Figure 11:
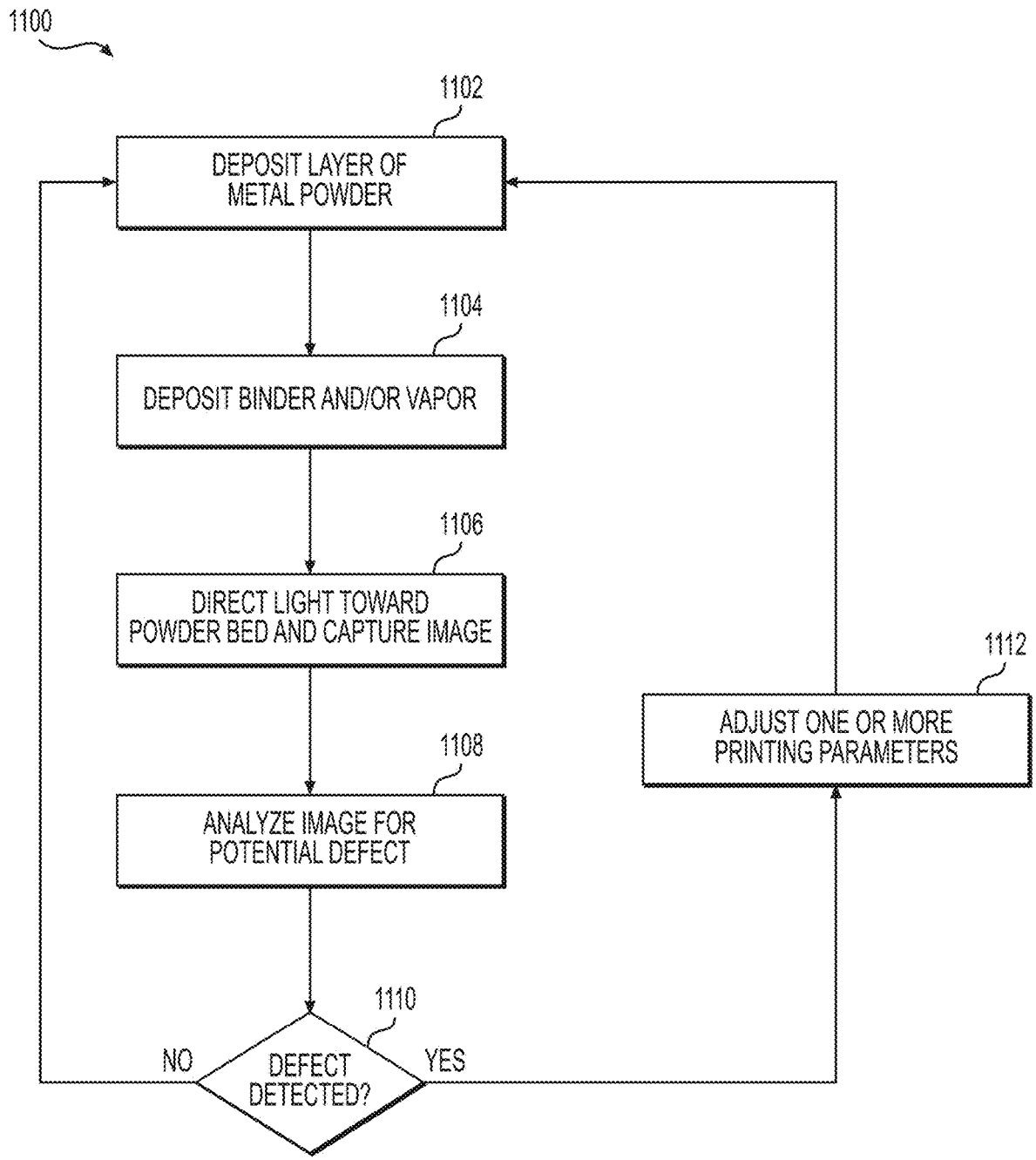
FIG. 11 is a flow chart illustrating an exemplary defect detection and/or correction method.

FIG. 11 is a flowchart of an exemplary method or process 1100 for defect detection and/or correction (or mitigation). Method 1100 may be repeatedly performed during additive manufacturing with, e.g., binder jet fabrication subsystem 102, 102'. In an exemplary implementation, method 1100, as well as methods 1200 and/or 1300 described below, may be performed one or more times during the deposition of a plurality of layers of powder in subsystem 102, 102'.

Method 1100 may include a step 1102 during which a layer of powder is deposited on a powder print bed. This powder may include at least one of a metal, a ceramic, or a polymer. In some aspects, this powder includes metal. This deposition of powder may be performed by distributing and spreading a layer of powder via spreader 122, as described above. At least partially concurrently and/or subsequently, during a step 1104, binder material 132 and/or vapor 152 may be selectively applied, e.g., by print head 126, 126', to one or more portions of the metal powder that was deposited in step 1102.

Following the completion of one or both of steps 1102 and 1104, and/or during at least a portion of steps 1102 and 1104, light may be directed toward powder bed 124, including both unbound powder 140 and bound powder 142, in step 1106. Step 1106 may include application of low-angle light 182, high-angle light 192, or both (at the same or different times), in the manner described above. During the application of low-angle light 182 and/or high-angle light 192, image capturing device 174 may capture an image of a portion or an entirety of powder bed 124. In one aspect, a plurality of images are captured by image capturing device 174 during step 1106, including at least one image during the application of low-angle light 182 and at least one image during the application of high-angle light 192. Thus, step 1106 may be performed once or repeated two or more times to acquire image(s) under one or both lighting conditions. In one aspect, step 1106 may be performed by continuously capturing (e.g., capturing real-time or delayed video) images of at least a portion of powder bed 124. Exemplary images captured by image capturing device 174 during step 1106 may look, for example, like any of FIG. 3A, 3B, 5A, 5B, 7A, 7B, 9A, 9B, 10A, or 10B.

Step 1108 may include analyzing one or more of the image(s) captured during step 1106. This analysis may include, for example, determining the presence of any of the features associated with one or more potential defects, as described above. For example, step 1108 may include analyzing images to determine whether powder bed 124 contains blisters 210, missing binder 220, divots 230, beading 1501, and/or smears 240. This determination may be performed by, e.g., performing a manual observation and analysis of one or more images captured in step 1106. However, this analysis may be conducted automatically by controller 128, 128', or by a separately located processor, for example, with image-analysis software loaded thereon, instead of, or in addition to, manual analysis. Any suitable image-analysis software, such as software for shape recognition, may be employed for image analysis via a controller.

Each image may be analyzed in isolation, or may be compared to another image. For example, a pair of images under different lighting conditions, including an image captured during the application of low-angle light 182 and an image captured during the application of high-angle light 192, may be compared to each other. By performing such a comparison, it may be possible to more accurately determine whether a darkened or brightened portion of the image captured with, low-angle light 182, for example, is formed by a defect, as opposed to bound powder 142 or unbound powder 140. Step 1108 may include comparing one or more of the captured images with a design file (e.g., computer-aided design file, three-dimensional model, images, or other data useful for controlling the operation of print heads, such as print head 126, 126', or any other suitable file) representative of the part(s) 134. For example, analysis of such a design file e.g., for one or more particular layers corresponding to the layer deposited in step 1102, may facilitate the identification of a bright spot or shadow that is produced by a defect. Step 1108 may also include comparing an image of a previous (underlying) layer of powder to an image of the current (or overlying) layer of powder. In one aspect, this comparison may allow the defect detection system to assist with or perform a determination of whether defect(s) have been resolved, severity of defects have been increased or decreased, whether new defect(s) have been created, etc. Moreover, images of a plurality of underlying layers in different lighting conditions may be compared to overlying layer(s) in different lighting conditions. For example, two images captured under low-angle light may be compared, and/or two images captured under high-angle light may be compared to each other.

Step 1108 may include analyzing one or more images for blisters 210 by identifying the presence of a bright spot 212 adjacent to a shadow 214, or the presence of a shadow 214 alone. In particular, step 1108 may include identifying the presence of a bright spot closer to low-angle light source 180 and a shadow 214 farther from low-angle light source 180, and/or by determining a circularity of a potential defect. In one aspect, a circularity value of between 0.5 and 1.0 may be indicative of the presence of a blister 210. Additionally or alternatively, a blister 210 may be identified based on a size of the potential defect. For example, a size, or diameter, in a range of about 0.1 mm, to about 1.0 mm, may indicate the presence of a blister 210. Such an image may be analyzed in isolation, may be compared to a corresponding image taken during application of high-angle light 192, or may be compared to an image taken of an underlying layer. Step 1108 may include analyzing each image (whether taken under low-angle or high-angle light) individually for the presence of one or more defects. In one aspect, image(s) taken under the application of low-angle light may be analyzed for the presence of defects that are readily discernible under low-angle light (e.g., blistering, divots, smears, beading), while image(s) taken under the application of high-angle light may be analyzed for the presence of defects that are readily discernible under high-angle light (e.g., missing binder, divots, smears). Additionally, a plurality of images may be compared to each other during step 1108. For at least some defects, such as blistering and missing binder, the presence of bright spots and dark spots in an image captured under low-angle light, and the absence of bright spots and dark spots in the corresponding region(s) of an image captured under high-angle light, may be indicative of a defect. For example, when bright spots and dark spots are in an image captured under low-angle light but absent from an image captured under high-angle light, this may be indicative of blistering.

Step 1108 may include analyzing one or more images for the presence of missing binder 220. In one aspect, this analysis may be performed to identify missing binder 220 in one or more images captured during step 1106 when high-angle light 192 was directed toward powder bed 124. This may include comparing lighter regions of the powder bed (regions that reflect more light) indicative of unbound powder 140 to a data file including information corresponding to the part 134 or the intended location of part 134 on the powder bed. Missing binder 240 may be detected when these lighter portions are present in an area where part 134 should be present. Thus, as illustrated in FIG. 5B for example, the presence of one or more portions of unbound powder 140 in a region of part 134 may be identified during step 1108.

Step 1108 may also include analyzing one or more images for the presence of divots 230. This may be performed by analyzing the image(s) for the presence of a bright spot adjacent to a shadow, as exemplified by divot bright spots 232 and divot shadows 234 shown in FIG. 7A. As described above, a divot 230 may be identified by the presence of a bright spot 232 closer to low-angle light source 180 as compared to shadow 234. Thus, the analysis for divots 230 may be performed with an image captured during the application of low-angle light 182. However, the analysis for divots 230 may be performed with one or more images captured during the application of high-angle light 192, by identifying one or more dark portions or shadows present in powder bed 124, as illustrated in FIG. 7B.

Step 1108 may include analyzing one or more images for the presence of smears 240 on powder bed 124. Smears 240 may be detected by, e.g., analyzing one or more images captured during the application of low-angle light 182 for the presence of a bright spot 246 adjacent to a shadow 248 or between a pair of shadows 248, and/or a series of bright spots 246 and shadows 248. Smears 240 may also be detected by determining whether an aspect ratio exceeds a predetermined threshold (e.g., 2:1, 5:1, or 10:1), and/or by evaluating contrast, sharpness, or both, of the potential defect. Step 1108 may also include analyzing one or more images captured with high-angle light 192 for the presence of a dark line or crack formed by recessed portion 244, as shown in FIG. 9B.

Step 1108 may include analyzing one or more images for the presence of beading 1501 on the powder bed. Beading may be detected by, e.g., analyzing one or more images captured during the application of low-angle light for the presence of dark (I.e. lower reflected brightness) regions partially or completely contained within a region where binder deposition is expected.

Step 1108 may also include analyzing the image for other or additional defects. For example, step 1108 may include analyzing one or more images for the presence of bleeding defects, which may occur when binder material 132 spreads beyond the desired area for part 134. Detection of bleeding defects can be performed by measuring a dimension of a captured image with one or both of high angle lighting and low angle lighting, and comparing to the expected dimension of a printed image based on image data sent to the printheads.

Step 1110 may be performed based on the analysis performed in step 1108, and may include performing a determination of whether any of the above-described defects are present in powder bed 124. If no defects are detected during step 1108, the determination in step 1110 may be negative (no), and method 1100 may proceed from step 1110 to step 1102, in which an additional or subsequent layer of metal powder may be deposited. However, if one or more defects are detected during step 1108, the determination in step 1110 may be affirmative (yes), and process 1100 may proceed to step 1112, in which one or more printing parameters of binder jet fabrication subsystem 102, 102' may be adjusted to mitigate and/or correct a detected defect. If desired, step 1112 may be omitted from process 1100.

In one aspect, step 1112 may include adjusting one or more of: dispensing and spreading of powder material, application of binder material 132, or application of vapor 152. Any suitable adjustments or corrections, including the examples described below (see steps 1216, 1218, 1310, 1312, 1316, and/or 1318), may be performed during step 1112. For example, in response to detection of one or more blisters 210, a saturation of selective portions of powder bed 124 may be decreased. This may be performed, for example, by reducing an amount, drop size, or drop resolution (deposited drops per inch) of one or both of binder material 132 and vapor 152.

In response to detection of missing binder 220, print head 126, 126' may be moved to a maintenance station that includes equipment for removing material from one or more discharge orifices 130, 130'. If desired, print head 126, 126' may be replaced by a manual or automated process in response to the detection of missing binder 220. For example, if one or more ejection orifices are identified as being obstructed, clogged, or otherwise not ejecting binder, and these ejection orifices do not recover to their desired function after one or more maintenance cycles (printhead cleaning, purging of binder agent, or other cleaning actions), the print head may be replaced. Additionally or alternatively, in response to detection of missing binder 220, an amount of deposited vapor 152 may be increased. In one embodiment, an amount of vapor deposited may be increased by approximately 5%. In one embodiment, an increased amount of deposited vapor may be achieved by increasing a pressure of a boiler vessel used for creation of vapor. In another embodiment, vapor deposition amount may be increased. In a printer which prints bi-directionally (that is, spreads powder and binder in both the positive and negative directions of travel), an amount of vapor deposited may be increased in only one direction, or may be increased in both directions. This increase may, for example, be performed for an overall area, or within a local area. Additionally or alternatively, in response to detection of missing binder 220, an amount of deposited binder 220 may be increased, e.g., by depositing more binder from one or more discharge orifices in the region of the location of a blocked discharge orifice. In one embodiment, an amount of deposited binder may be increased by approximately 5%. In one embodiment, an increase in binder deposition may be accomplished by increasing a greyscale of an image (that is, increasing the number of pixels which are printed in comparison to the number of pixels which are unprinted). In another embodiment, an increase in binder deposition may be achieved by increasing the ejected droplet size or mass by modifying an electrical signal (waveform) sent to a printhead. In another embodiment, an increase in binder deposition may be achieved by increasing the printing resolution (number of pixels per inch) in a printing direction, e.g., by changing a resolution from 1200 pixels per inch to 1300 pixels per inch, which printing droplets of the same size and at the same greyscale. Additionally or alternatively, in response to detection of missing binder 220, a flow of air to an air knife may be increased (e.g., to facilitate removal of excessively mobile powder, or to facilitate removal of undesirable aerosolized binder from the region of the printhead).

Additionally or alternatively, step 1112 may include initiating an alert (e.g., via a displayed warning or audio cue) in response to the detection of a defect. For example, step 1112 may include displaying an indication that a blister, missing binder, divot, smear and/or any other defect was detected on powder bed 124. This indication may include information regarding the type and location of the defect (e.g., on a part or spaced away from any part), the number of defects, the density of defects, the size of defects, the severity of defects, etc. Thus, the indication may allow an operator to determine whether remedial action is necessary, or whether binder jetting may continue. Step 1112 may include creating a record, e.g., an electronic record, of one or more detected defects. This record may be used, for example, once manufacturing is complete, to provide information about a part, e.g., to assist in determining whether the part is acceptable (pass) or should be rejected (fail), or should be subjected to further inspection prior to a final determination, based on manufacturing tolerances.

Figure 12:
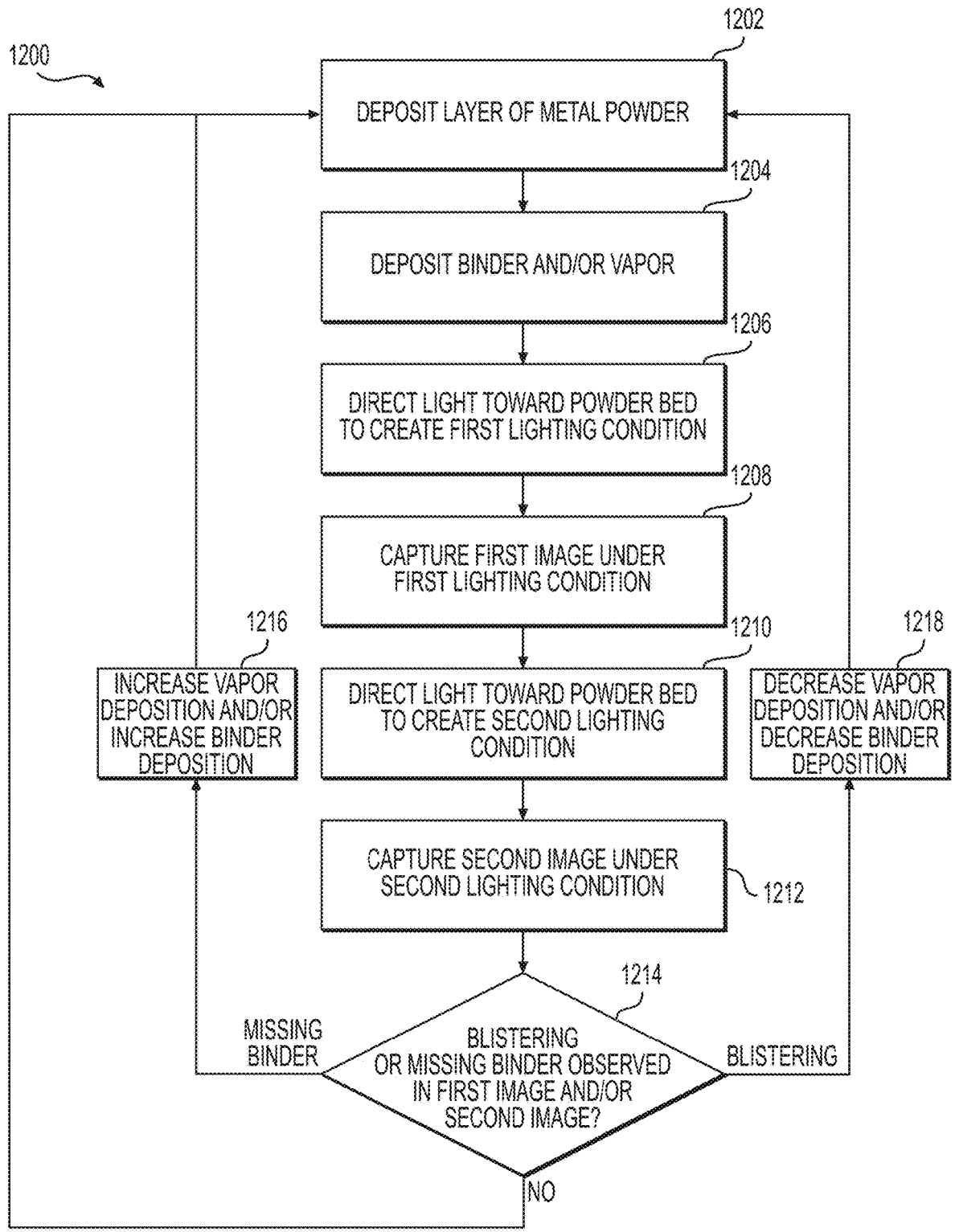
FIG. 12 is a flow chart illustrating an exemplary defect detection and/or correction method.

FIG. 12 is a flowchart illustrating an exemplary process 1200 for defect detection and/or correction. Process 1200 may include steps 1202 and 1204, which may be performed in the same manner as steps 1102 and 1104 described above. In a step 1206 that may follow step 1204, light may be directed under a first lighting condition. The first lighting condition may correspond to light generation by only low-angle light source 180, or only by high-angle light source 190. During the direction of light from one of light sources 180, 190, step 1208 may including capture one or more first images under this first lighting condition image with capturing device 174. Accordingly, step 1208 may be performed simultaneously with step 1206, or step 1208 may occur during performance of step 1206.

Once image capturing under the first lighting condition is complete, light may be directed toward powder bed 124, including metal powder and binder, in step 1210. This lighting may create a second lighting condition that is different from the first lighting condition. For example, if low-angle light 182 is used to create the first lighting condition in step 1206, high-angle light 192 may be used to create the second lighting condition in step 1210, or vice-versa. In step 1212, image capturing device 174 may capture one or more second images during the second lighting condition. As discussed above, step 1212 may be performed simultaneously with step 1210, or step 1212 may occur during performance of step 1210.

In a step 1214, the images captured in steps 1208 and 1212 may be analyzed for the presence of one or blisters 210 (or bleeding) and/or missing binder 220. The image analysis may be performed by comparing a plurality of images taken under the first and second lighting conditions, comparing one or more images to data contained in a design file, and/or comparing an image of a layer to an image of an underlying layer. In at least some powder beds 124, it may be unlikely for a region of powder bed 124 to experience both blistering 210 and missing binder 220. Rather, a region of powder bed 124 may experience either blistering 210 or missing binder 220. This is because missing binder 220 may be associated with inadequate deposition of vapor 152 (e.g., insufficient vapor 152 may tend to form overly-mobile powder, which may block one or more discharge orifices 130, leading to inadequate deposition of binder 220 in subsequent layers), while blistering may be associated with excessive deposition of vapor 152 or binder 220 (e.g., due to air becoming trapped underneath deposited binder 220). Thus, step 1214 presents different paths, to steps 1216 and 1218 respectively, for correcting missing binder defects and blistering defects. However, if both missing binder and blistering occur, both steps 1216 and 1218 may be performed, for example, in different regions of the powder bed, as described below. Alternatively, if no defects, or too few defects are detected, then no changes may be made to vapor and/or binder deposition (e.g., neither step 1216 nor 1218 may be performed). In such instance, the method may be repeated again for a subsequent layer.

When missing binder 220 is observed or detected in step 1214, a setting for vapor deposition may be changed. For example, an amount of vapor 152 deposited by vapor deposition device 150 may be increased in step 1216. In one aspect, a flow rate or quantity (mass) of deposited vapor, e.g., steam, may be set to a larger value from a previous, e.g., default, value. For example, a flow rate of water to a steamer device of vapor deposition device 150 may be set to an increased value in step 1216. In some aspects, the amount of increase in the flow rate of vapor may be approximately 5% to approximately 10%. Additionally or alternatively, a duration of a deposition of vapor 152 and/or a pressure at which vapor 152 is expelled may be increased (set to increased value(s)) in step 1216. Step 1216 may include increasing an amount of binder material 132 that is deposited (e.g., by increasing a deposition rate of binder material 132, either globally or locally by depositing more binder from one or more discharge orifices in the region of the location of a blocked discharge orifice, or by depositing binder from more discharge orifices, or by increasing a resolution of printing in a print direction, e.g. by printing more dots per inch).

When blistering (and/or bleeding) is observed or detected in step 1214, an amount of vapor 152 deposited by vapor deposition device 150 may be decreased in step 1218. For example, a flow rate of water to the steamer device may be set to a reduced value in step 1216. This decreased amount of deposited vapor 152 may be achieved by reducing the flow rate or mass of deposited vapor 152, a duration of vapor 152 deposition and/or a pressure at which vapor 152 is expelled from vapor deposition device 150. In some aspects, the amount of decrease in the flow rate of vapor may be approximately 5% to approximately 10%. Additionally or alternatively, step 1218 may include decreasing an amount of binder material 132 that is deposited (e.g., by decreasing a deposition rate of binder 132, either globally or locally by depositing less binder from one or more discharge orifices in the region of the location of a blocked discharge orifice, or by depositing binder from fewer discharge orifices, or by decreasing a resolution of printing in a print direction, e.g. by printing fewer dots per inch).

Negative feature printing can be used to ameliorate or eliminate blistering. This process involves intentionally creating a plurality of negatively printed features within at least some of the series of cross-sectional shapes, wherein an amount of binder fluid to be deposited in the negatively printed features is less than an amount of binder fluid to be deposited in a remainder of the cross-sectional shape. The amount of binder fluid to be deposited in the negatively printed features and a size of the negatively printed features may be configured to allow gas to escape from the powder bed. Said differently, in portions of part layer where a continuous cross-section is desired formations of unbound powder are intentionally created. These formations are, however, bounded by jetted powder, preferably on all sides within the layer. The negative feature pattern therefore will be captive within the green part. When the part is sintered, the negatively printed regions are densified along with the remainder of the part, creating the desired cross-section.

In another embodiment, when blistering is observed or detected in step 1214, a negative feature pattern may be added or adjusted while maintaining a constant average amount of binder, e.g. if a circular negative feature pattern is in use, a diameter of a negative feature in the pattern may be increased, allowing for air to escape and preventing formation of trapped air causing blisters.

In one aspect, vapor deposition device 150 may have a plurality of orifices for outputting vapor. The analysis of the first and/or second image may result in the identification of blistering 210 or missing binder 220 in one or more regions of powder bed 124. These regions may tend to extend in one or more lines along the direction of the movement direction of discharge orifice 130 (via print head 126) and vapor deposition device 150 (FIGS. 1B, 1C). For example, when print head 126 and vapor deposition device 150 move in a horizontal (left to right) direction of FIGS. 3B and 5B, blisters 210 or missing binder 220 may tend to form in lines along this path. Thus, one or more corrective actions (e.g., steps 1216, 1218) may be taken with respect to a vapor deposition device 150 associated with the location of the observed blister 210 or missing binder 220 defect. One of these corrective actions may be taken for a first region, while the other action may be taken for a second region. In some aspects, the corrective actions may be implemented across the entire powder bed 124. These corrective actions may be performed, for example, when depositing vapor in step 1204 on one or more subsequent layers of metal powder. In a printer which prints bi-directionally (that is, spreads powder and binder in both the positive and negative directions of travel), an amount of vapor deposited may be increased in only one direction, or may be increased in both directions. For beading defects, the vapor deposition may be the adjusted similarly to the methods discussed below regarding missing binder. Alternatively or in addition, the vapor deposition device 150 may be subjected to an inspection and/or cleaning maintenance cycle.

Figure 13:
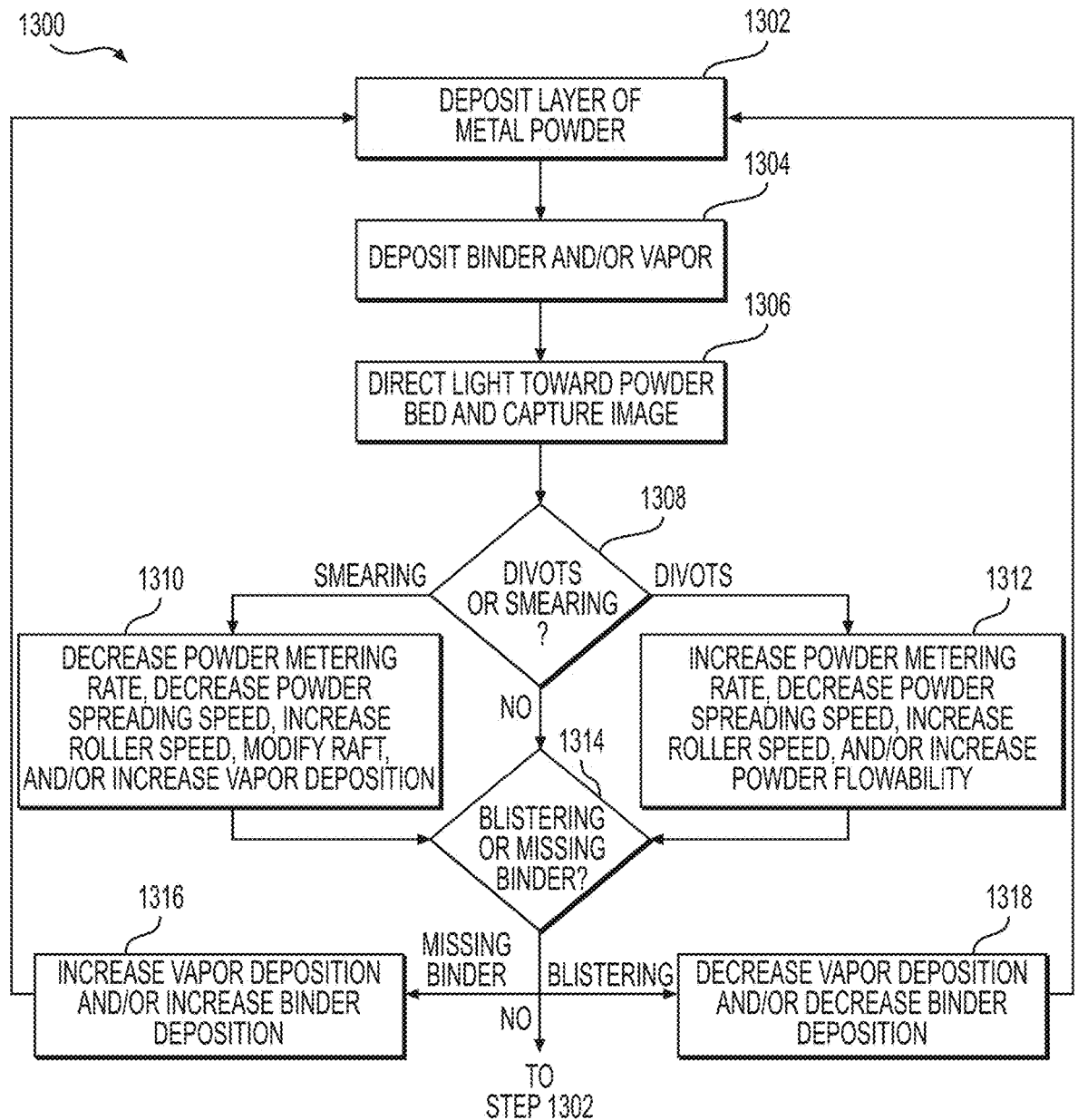
FIG. 13 is a flow chart illustrating an exemplary defect detection and/or correction method.

FIG. 13 is a flowchart illustrating an exemplary process 1300 for defect detection and/or correction (or mitigation). Steps 1302 and 1304 of process 1300 may be performed in the same or similar manner as steps 1102, 1104, 1202, 1204, as described above. During a step 1306, light may be directed toward powder bed 124 in a manner similar to step 1106 to create a first lighting condition or a second lighting condition, as described above. Step 1306 may include capturing an image during the first or second lighting condition. In one aspect, image capturing may be repeated to ensure that at least one image is captured at each lighting condition.

Step 1308 may include analyzing the captured image(s) for divot defects 230 and/or smear defects 240 (e.g., by analyzing the captured image(s) for the presence of shadows and/or bright spots, as described above), and determining whether divots 230 and/or smears 240 are present in powder bed 124. This may be performed in any suitable manner, for example, as described above with respect to step 1108.

Step 1308 may include analyzing the captured image(s) for smear defects 240 by determining the presence of one or more smear bright spots 242 or one or more smear shadows 248. For example, an image under the first lighting condition may be analyzed for the presence of smear shadows 248, alone (e.g., for images taken under high-angle light) or in combination with smear bright spots 246 (e.g., for images taken under low-angle light). Additionally or alternatively, an image under the second lighting condition may be analyzed for the presence of cracks or darkened portions, as shown in FIG. 9B. Step 1308 may also include comparing a plurality of images taken under the first and second lighting conditions, comparing one or more images to data contained in a design file, and/or comparing an image of a layer to an image of an underlying layer, as described above with reference to method 1100.

Step 1308 may include analyzing an image for the presence of one or more divot bright spots 232 and one or more divot shadows 234. In one aspect, an image captured under the first lighting condition (e.g., low-angle light 182) may be analyzed for the presence of a divot shadow 234 closer to a low-angle light source 180 as compared to a divot bright spot 232. If desired, an image captured under the second lighting condition (e.g., high-angle light 192) may be analyzed for the presence of one or more darkened portions indicative of divot shadows 234 (see FIG. 7B).

When one or more smears 240 are detected in step 1308, a step 1310 may be performed to correct (or mitigate) the occurrence of smear defects 240. In an embodiment, Step 1310 may include decreasing a flow rate of powder (powder metering) from hopper 121 (FIG. 1C), for example decreasing a metered amount of powder by an amount between 5% and 10%. In a bed-to-bed binder jet printing system as described in FIG. 1b, a decreased powder metering amount may be achieved by decreasing an the amount of powder delivered from the powder supply. In a binder jet printing system as described in FIG. 1c, a decreased powder metering amount may be achieved by decreasing the dispensing rate from the metering hopper. In an embodiment, the dispensing rate from a metering hopper may be decreased by decreasing the rotation rate of one or more dispensing rollers; in another embodiment, the dispensing rate from a metering hopper may be decreased by decreasing a vibration frequency or amplitude. Based on the location of the smear defects 240 detected in step 1308, a metering rate may be decreased at every location along the powder bed in the direction of travel. In an embodiment, based on the location of smear defects 240 detected in step 1308, a metering rate may also be decreased in only a portion of the bed, for example in a region or regions of the bed where smearing is detected. For example, if smear defects 240 are detected on parts at the trailing edge of the powder bed (i.e. the last part of the powder bed traversed by the metering hopper), the metering rate may be decreased when the metering hopper is traversing the trailing edge of the powder bed, or in a region a distance, for example, 20 mm to 50 mm, ahead of the region where the smearing defects are detected. In another embodiment, step 1310 may include decreasing a speed at which powder is spread (e.g., a speed of translation of one or more spreaders 122, 122'), and/or increasing a roller speed (e.g., a speed of rotation of one or more spreaders 122, 122'), for example increasing a roller speed by between 5% and 10%. Thus, step 1310 may cause a decrease in the deposition rate of powder. Additionally, step 1310 may include changing (e.g., increasing) a vapor (e.g., steam) deposition rate. In an embodiment, a vapor deposition rate may be increased by between 5% and 10% by increasing a flow rate or a pressure. These changes may be set or stored in a memory of controller 128 and enacted during a subsequent performance of step 1302. Thus, it may be possible to identify and correct a smearing defect during binder-jetting, thereby preventing a failure in the production of part 134. Step 1310 may further include changing a size of a raft (i.e. sacrificial printed component) manufactured below a bottom layer of part 134. For example, step 1310 may include increasing a thickness of such a raft, for example increasing a raft thickness by 1 mm; and/or decreasing an offset (distance) between the part 134 and the raft. By adjusting a raft in this manner, it may be possible to improve the ability of the raft to provide an anchor to part 134 during the binder deposition process, improving the ability of the part 134 to resist forces imparted by, e.g., spreader 122, 122'. In some aspects, when producing a raft by binder jetting, it may be possible to detect the occurrence of smearing within the raft. Thus, by increasing a thickness of the raft and/or decreasing an offset between the part 134 and the raft, smearing may be prevented or mitigated in part 134. In some aspects, detection of smearing within a raft may be used as feedback to adjust a raft thickness when forming a subsequent part. Thus, occurrence of smearing may be reduced or eliminated when producing the raft or when performing a subsequent binder-jetting operation. In an embodiment, a raft may be printed continuously until no smearing defects are detected, at which point a separation layer may be printed followed by printing a part. In this manner a part with no smearing defect can be produced.

When one or more divots 230 are detected in step 1308, a step 1312 may be performed to correct (or mitigate) the occurrence of divots 230. Step 1312 may include adjusting one or more settings related to the deposition and spreading of powder. In one embodiment, step 1312 may include for example, increasing a metered amount of powder by an amount between 5% and 10%. In a bed to bed binder jet printing system as described in FIG. 1b, an increased powder metering amount may be achieved by increasing an upward increment amount of the Feed Bed. In a binder jet printing system as described in FIG. 1c, an increased powder metering amount may be achieved by increasing the dispensing rate from the metering hopper. In an embodiment, the dispensing rate from a metering hopper may be increased by increasing the rotation rate of one or more dispensing rollers; in another embodiment, the dispensing rate from a metering hopper may be increased by increasing a vibration frequency or amplitude. Based on the location of the divots 230 detected in step 1308, a metering rate may be increased at every location along the powder bed in the direction of travel. In an embodiment, based on the location of divots 230 detected in step 1308, a metering rate may also be increased in only a portion of the bed, for example in a region or regions of the bed where divots are detected. For example, if divots 230 are detected on parts at the trailing edge of the powder bed (i.e. the last part of the powder bed traversed by the metering hopper), the metering rate may be increased when the metering hopper is traversing the trailing edge of the powder bed, or in a region a distance, for example, 20 mm to 50 mm, ahead of the region where the divots are detected. In another embodiment, step 1312 may include decreasing a speed at which powder is spread (e.g., a speed of translation of one or more spreaders 122, 122'), and/or increasing a roller speed (e.g., a speed of rotation of one or more spreaders 122, 122'), for example increasing a roller speed by between 10% and 20%. The ratio of the speed of translation to the speed of rotation of spreaders 122, 122' may be modified to increase a rate at which powder is deposited, for example increasing a number or rotations per distance of roller translation by between 10% and 20%. These changes may be set (changed) and stored in a memory of controller 128 and employed during a subsequent performance of step 1302. Thus, it may be possible to identify and correct a divot defect during binder-jetting, thereby preventing a failure in the production of part 134. In another aspect, step 1312 may include changing an environmental condition in the printing environment. For example, a relative humidity (or dewpoint, or other equivalent measurement of moisture contained in a printing environment) in a printing environment may be increased by between 2% and 10% decrease in relative humidity, by means of a humidifier (e.g. a nebulizing type humidifier, or a vapor-type humidifier, or any other suitable device for adding moisture to a gas in order to increase the relative humidity); or by means of decreasing a flow rate of a process gas (e.g. nitrogen gas, argon, compressed dry air). In another embodiment, relative humidity may be decreased, for example by between 2% and 10% relative humidity, by means of increasing a flow rate of a process gas (e.g. nitrogen gas, argon, compressed dry air), or by decreasing a flow rate of a humidifier. In another aspect, step 1312 may include changing powder processing for subsequent operations of binder jet fabrication subsystem 102, 102', or subsequent layers of powder deposited in the same operation. For example, powder may be treated to provide the powder with an increased flowability in the same or subsequent manufacturing operation, for example by increasing a duration of a heating step, or by increasing a temperature of a heating step. By employing any or all of these actions, the occurrence of divots may be reduced or eliminated.

While steps 1310 and 1312 are illustrated as alternative paths in process 1300, when both divots 230 and smears 240 are detected during step 1308, two or more corrective actions of steps 1310 and 1312 may be performed. For example, powder spreading speed may be decreased and/or a raft may be modified to address both smearing and divot defects. Or, different corrective measures may be taken in different regions of the powder bed depending on where the respective type of defect is occurring.

Step 1314 may include analyzing the captured image(s) for the presence of blisters 210 or missing binder 220 in the same manner described above with respect to steps 1108 or 1214. When missing binder 220 is detected, step 1316 may be performed in the same manner as step 1216, as described above. Similarly, when one or more blisters 210 are detected in step 1308, step 1318 may be performed in the same manner described above with respect to step 1218. Moreover, when both missing binder and blistering are detected (e.g., in different regions of powder bed 124), both steps 1316 and 1318 may be performed. For example, steps 1316 and 1318 may be performed at different regions of binder jet fabrication subsystem 102, 102'. Thus, blistering and missing binder defects may be mitigated and corrected during a manufacturing process, which may prevent a failed production of one or more parts 134. If no defects are detected in steps 1308 and 1314, the process may return to step 1302 without making adjustments or corrections to address a defect in powder bed 124. While step 1314 for determining the presence of blistering or missing binder is depicted as being performed after step 1308 in FIG. 13, step 1314 may be performed simultaneously with step 1308, or these steps may be performed in any sequence.

While some aspects, including methods 1100, 1200, and 1300, may describe use of a metal powder, it is understood that the powder may include one or more polymer or ceramic materials, instead of, or in addition to, metal.

Other embodiments of the present disclosure will be apparent to those skilled in the art from consideration of the specification and practice of the embodiments disclosed herein. While certain features of the present disclosure are discussed within the context of exemplary systems, devices, and methods, the disclosure is not so limited and includes alternatives and variations of the examples herein according to the general principles disclosed. It is intended that the specification and examples be considered as exemplary only, with a true scope and spirit of the present disclosure being indicated by the following claims.

What is claimed is:

1. A method of detecting and ameliorating defects during metal additive manufacturing, comprising the steps of:
   spreading a metal powder on a powder bed of a metal additive manufacturing system and depositing a predetermined pattern of binder to the metal powder to form a layer of a green part;
   illuminating the layer of the green part with a first light source;
   capturing via an imaging device a first image of the illuminated layer of the green part;
   analyzing the first image and identifying a first defect in the layer of the green part, wherein the first defect is one of a blister, a divot, beading, a smear and a jet-out condition;
   and adjusting at least one printing parameter in response to identifying the first defect to ameliorate the first defect.

2. The method of claim 1 wherein an axis of the first light source is angled with respect to the powder bed by 1 degree to 10 degrees.

3. The method of claim 1 wherein an axis of the first light source is angled with respect to the powder bed by 70 degree to 110 degrees.

4. The method of claim 1 wherein the step of analyzing includes identifying at least one shadow in the first image.

5. The method of claim 1, wherein the step of analyzing includes identifying at least one region that is brighter than an average brightness of the layer of the green part.

6. The method of claim 1 wherein the step of analyzing includes detecting a bright spot and an associated shadow.

7. The method of claim 1 wherein step of analyzing includes detecting at least one of a region of missing binder material, a bright region and a shadow in the first image.

8. The method of claim 1 wherein the printing parameter is one of a vapor deposition rate, a binder deposition rate, and a negative feature pattern.

9. The method of claim 1, further comprising the steps of, illuminating the layer of the green part with a second light source;
   capturing via a second imaging device a second image of the illuminated layer of the green part;
   analyzing the second image and identifying a second defect in the layer of the green part; and
   adjusting at least one printing parameter in response to identifying the second defect to ameliorate the second defect.

10. A method of detecting defects during metal additive manufacturing, comprising the steps of:
    spreading a metal powder on a powder bed of a metal additive manufacturing system and depositing a predetermined pattern of binder to the metal powder to form a layer of a green part;
    generating a first illumination condition and capturing a first image of the illuminated layer of the green part with a first imaging device;
    generating a second illumination condition and capturing a second image of the illuminated layer of the green part with a second imaging device; and
    comparing the first image and second image to at least one of each other, a design file and a third image and identifying a first defect in the layer of the green part, wherein the defect is one of a blister, a divot, a smear, beading and a jet-out condition.

11. The method of claim 10 wherein an axis of the first light source is angled with respect to the powder bed by 1 degree to 10 degrees.

12. The method of claim 11 wherein an axis of the second light source is angled with respect to the powder bed by 70 degree to 110 degrees.

13. The method of claim 10 wherein the step of analyzing includes identifying at least one shadow in one of the first image and second image.

14. The method of claim 10, wherein the step of analyzing includes identifying at least one region that is brighter than an average brightness of the layer of the green part.

15. The method of claim 10 wherein the step of analyzing includes detecting a bright spot and an associated shadow.

16. The method of claim 10 wherein step of analyzing includes detecting at least one of a region of missing binder material, a bright region and a shadow in one of the first image and the second image.

17. The method of claim 10 further comprising adjusting at least one printing parameter in response to identifying the first defect, wherein the printing parameter is one of a vapor deposition rate, a binder deposition rate, and a negative feature pattern.

18. The method of claim 10 wherein the third image is an image of a preceding layer in the green part.

19. A method of identifying and clearing clogged jetting orifices in a binder jetting metal additive manufacturing system, comprising the steps of:
    spreading from a printhead a metal powder on a powder bed of a metal additive manufacturing system and depositing a predetermined pattern of binder to the metal powder to form a layer of a green part;
    illuminating the layer of the green part with a high angle light source;
    capturing an image of the illuminated layer of the green part with an imaging device;
    identifying areas of unbound powder according to the brightness an amount of reflected light;
    comparing the areas of unbound powder to a design file and identifying a defect indicating a jet-out condition; and
    subjecting the printhead to a maintenance cycle.

* * * * *